US012059696B2

(12) United States Patent
Miller et al.

(10) Patent No.: US 12,059,696 B2
(45) Date of Patent: Aug. 13, 2024

(54) SYSTEM AND METHOD FOR ACTUATING A TREATMENT DEVICE

(71) Applicant: The Boeing Company, Chicago, IL (US)

(72) Inventors: John Eric Miller, Oberlin, OH (US); Shane Edward Arthur, Kirkland, WA (US)

(73) Assignee: The Boeing Company, Arlington, VA (US)

( * ) Notice: Subject to any disclaimer, the term of this patent is extended or adjusted under 35 U.S.C. 154(b) by 369 days.

(21) Appl. No.: 17/660,404

(22) Filed: Apr. 23, 2022

(65) Prior Publication Data

US 2022/0388684 A1    Dec. 8, 2022

Related U.S. Application Data

(60) Provisional application No. 63/202,243, filed on Jun. 2, 2021.

(51) Int. Cl.
*B05B 13/02* (2006.01)
*B05B 13/04* (2006.01)
(Continued)

(52) U.S. Cl.
CPC ...... *B05B 13/0278* (2013.01); *G05B 19/4155* (2013.01); *B05B 13/0431* (2013.01); *B64F 5/10* (2017.01); *G05B 2219/45013* (2013.01)

(58) Field of Classification Search
None
See application file for complete search history.

(56) References Cited

U.S. PATENT DOCUMENTS

| 4,534,694 A | 8/1985 | Tuda |
| 5,931,098 A | 8/1999 | Bates |

(Continued)

FOREIGN PATENT DOCUMENTS

| CN | 103660658 | 3/2014 |
| EP | 0455371 | 11/1991 |

(Continued)

OTHER PUBLICATIONS

Wittstein Data Sheet, Cyber dynamic line—linear actuator, available at <https://cyber-motor.wittenstein-us.com/products/servo-motors/linear-actuators/cyber-dynamic-actuator-I-with-ball-screw/>, retrieved on May 2, 2021.

(Continued)

*Primary Examiner* — Ryan A Jarrett

(57) ABSTRACT

A device actuation system for actuating a treatment device includes a first drive gear rotatably mountable to the treatment device, a coupler rail slidably mountable to the treatment device, a second drive gear rotatably mountable to the coupler rail, and a coupler gear rotatably mountable to the treatment device and engageable with the coupler rail. In addition, the device actuation system includes a drive rail locatable between the first drive gear and the second drive gear of the gear system. The coupler gear is rotatable to move the coupler rail in a manner maintaining the second drive gear in continuous engagement with the drive rail against the first drive gear. The first drive gear and the second drive gear are rotatable in a manner causing at least one of translation and rotation of the treatment device relative to the drive rail.

20 Claims, 21 Drawing Sheets

(51) Int. Cl.
*B64F 5/10* (2017.01)
*G05B 19/4155* (2006.01)

(56) References Cited

U.S. PATENT DOCUMENTS

| | | | |
|---|---|---|---|
| 7,350,890 | B2 | 4/2008 | Baird et al. |
| 8,088,450 | B2 | 1/2012 | Swanberg et al. |
| 10,144,183 | B2 | 12/2018 | Baker |
| 10,220,408 | B2 | 3/2019 | Eng |
| 10,293,601 | B2 | 5/2019 | Baker |
| 10,307,788 | B2 | 6/2019 | Arthur |
| 10,308,039 | B2 | 6/2019 | Mathis |
| 10,369,679 | B2 | 8/2019 | Moriarty |
| 10,377,092 | B2 | 8/2019 | Baker |
| 10,384,217 | B2 | 8/2019 | Halamandaris |
| 10,384,482 | B2 | 8/2019 | Eng |
| 10,501,208 | B2 | 12/2019 | Whitlaw |
| 10,532,561 | B2 | 1/2020 | Ingram |
| 10,745,251 | B2 | 8/2020 | Miller |
| 10,875,045 | B2 | 12/2020 | Vasa |
| 10,953,417 | B2 | 3/2021 | Halamandaris |
| 11,505,217 | B2 * | 11/2022 | Klein ................ B25J 5/007 |
| 2009/0111701 | A1 | 4/2009 | Ahn |
| 2014/0347413 | A1 | 11/2014 | Ehara |
| 2018/0071773 | A1 | 3/2018 | Eng |
| 2018/0099518 | A1 | 4/2018 | Eng |
| 2018/0169687 | A1 | 6/2018 | Vasa |
| 2019/0002130 | A1 | 1/2019 | Whitlaw |
| 2019/0247884 | A1 | 8/2019 | Arthur |
| 2020/0198338 | A1 | 6/2020 | Riley |
| 2021/0094221 | A1 | 4/2021 | Smith |
| 2021/0331193 | A1 | 10/2021 | Yaghoobi |
| 2021/0387834 | A1 | 12/2021 | Olberg |

FOREIGN PATENT DOCUMENTS

| | | |
|---|---|---|
| EP | 2208541 | 7/2010 |
| EP | 2740563 | 6/2014 |
| EP | 2839964 | 2/2015 |
| EP | 3292914 | 3/2018 |
| EP | 3321088 | 5/2018 |
| EP | 3351308 | 7/2018 |
| JP | 2018035881 | 3/2018 |

OTHER PUBLICATIONS

Xaar Data Sheet, Xaar 1003 inkjet printhead, available at <https://www.xaar.com/en/products/xaar-printheads/xaar-1003-c/>, retrieved on Apr. 6, 2021.

EPO, Extended European Search Report for Application No. 22176248, issued on Oct. 28, 2022.

EPO, Extended European Search Report for Application No. 22169755, issued on Nov. 2, 2022.

\* cited by examiner

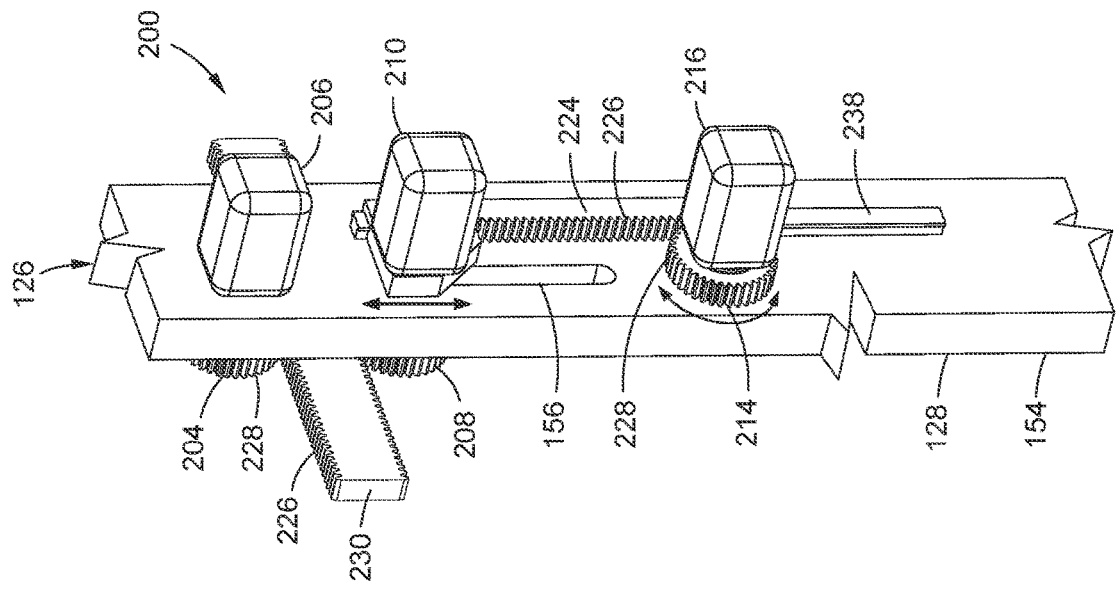
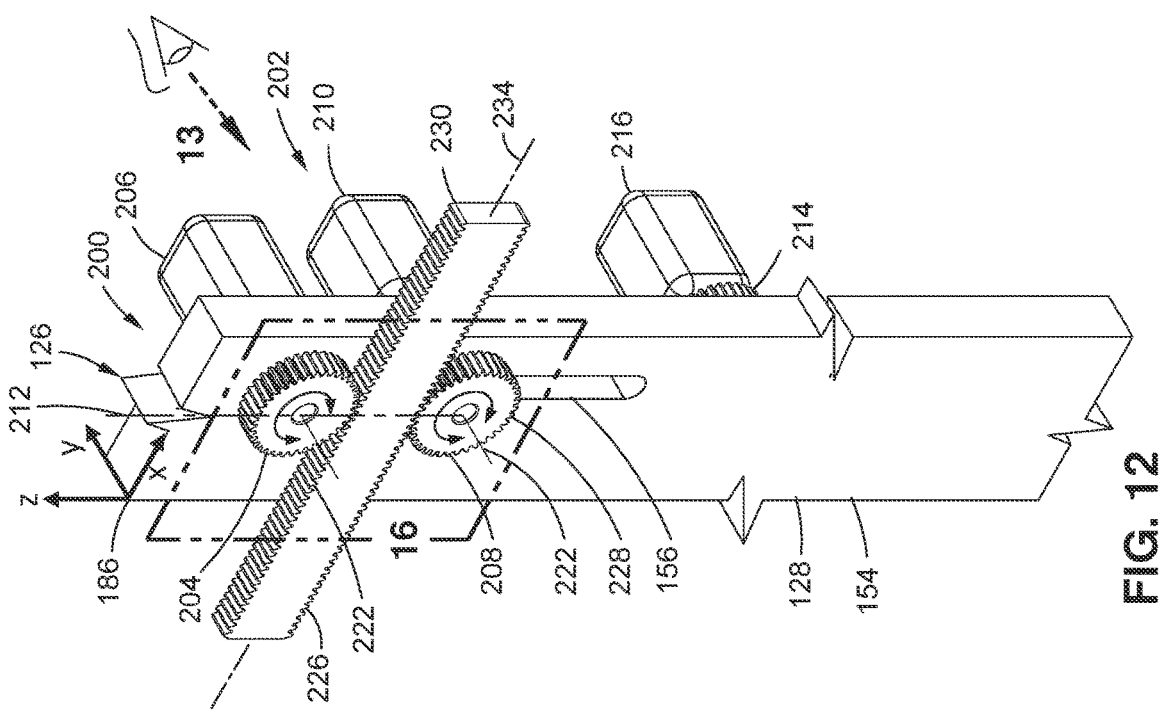
FIG. 13
FIG. 12

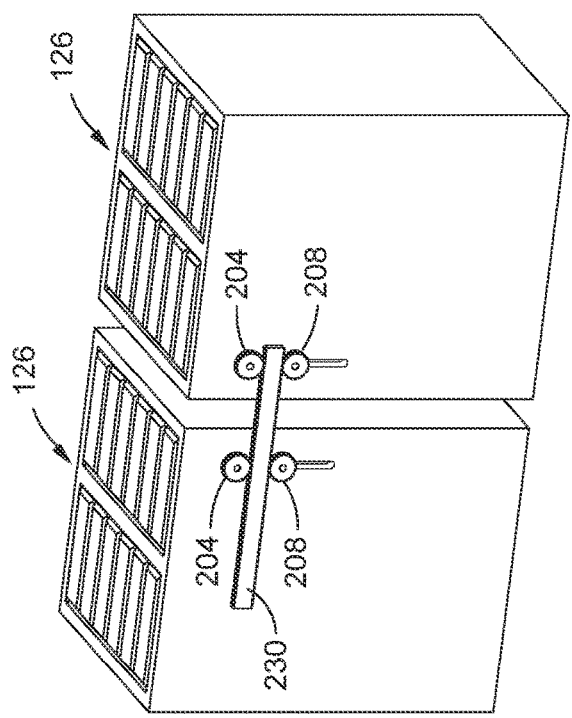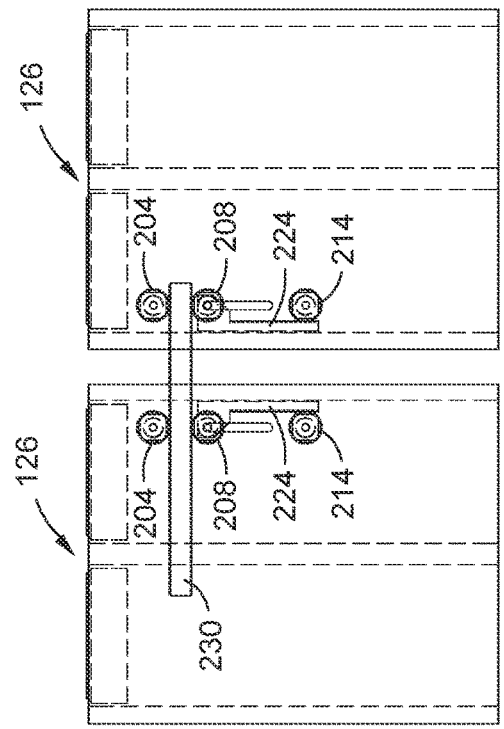

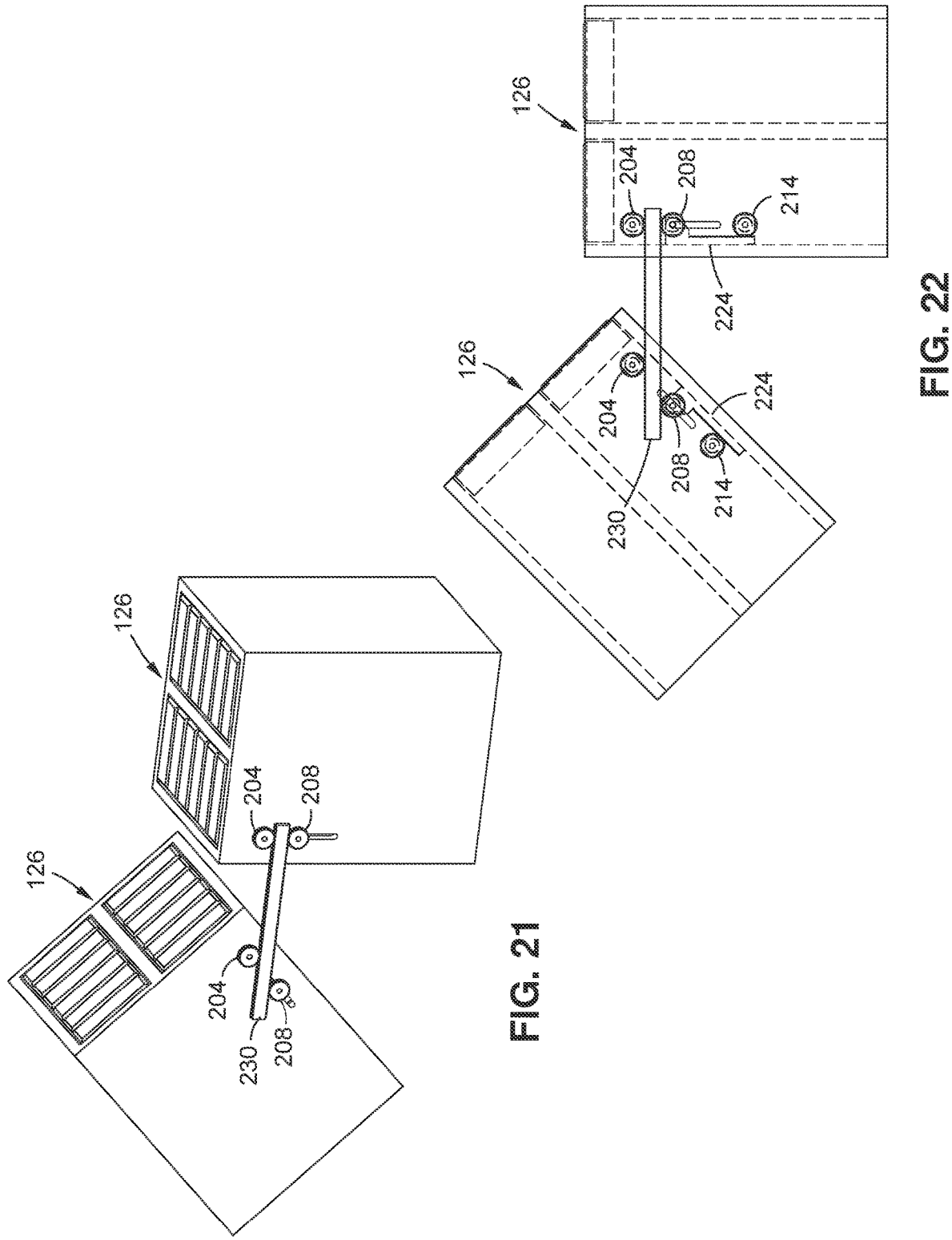

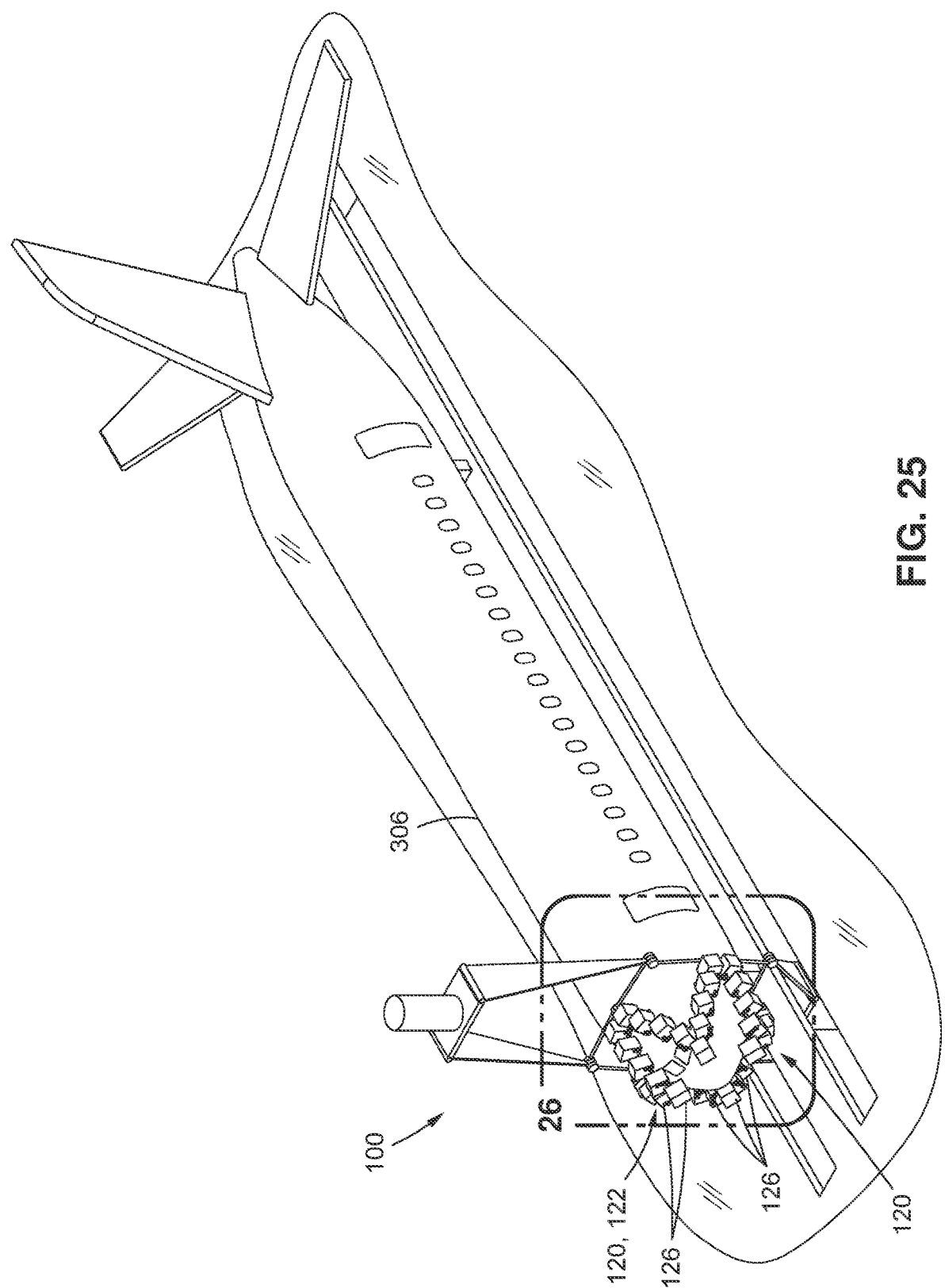

SYSTEM AND METHOD FOR ACTUATING A TREATMENT DEVICE

CROSS-REFERENCE TO RELATED APPLICATION

This non-provisional application claims priority to U.S. Provisional Application Ser. No. 63/202,243, entitled SYSTEM AND METHOD FOR ACTUATING A TREATMENT DEVICE, filed Jun. 2, 2021, and which is incorporated herein by reference in its entirety.

FIELD

The present disclosure relates generally to actuation systems and, more particularly, to a mechanical actuation system for actuating one or more treatment devices for treating contoured surfaces.

BACKGROUND

The painting of an aircraft is a challenging process due to the large amount of surface area and unique geometry of aircraft surfaces. For example, the nose and tail of an aircraft are typically highly contoured, which presents challenges in applying coatings in a precise manner. Adding to the challenge are complex paint schemes associated with an aircraft livery. For example, the livery of an airline may include images or designs that have complex geometric shapes and color combinations. In addition, an aircraft livery may include the name and logo of the airline, which may be applied to different locations on the aircraft such as the fuselage and the vertical tail. The process of applying the livery to the aircraft surfaces must be carried out with a high level of precision to meet aesthetic requirements, and to ensure that the coating thickness is within desired tolerances to meet aircraft performance (e.g., weight) requirements.

One method of painting an aircraft involves the use of individual robotic devices. Each robotic device includes an end effector mounted on a robotic arm. The robotic arm of each robotic device moves the end effector over the aircraft surfaces while the end effector dispenses any one of a variety of different paint colors, such as for applying an aircraft livery. Although the use of robotic devices reduces the amount of time required for aircraft painting relative to conventional manual methods that involve masking, painting, and demasking, the use of a single end effector on each robotic device results in a relative lengthy painting process.

As can be seen, there exists a need in the art for a system for interconnecting an array of treatment devices for dispensing a treatment (e.g., paint) as the array is moved over an article surface, and which allows for the continuous repositioning of each treatment complementary to the changing contours of the article surfaces, to thereby enable precise application of coatings (e.g., an aircraft livery) in a reduced amount of time relative to conventional methods. Ideally, the actuation system has a compact arrangement to allow for relatively close spacing of the treatment devices in the array.

SUMMARY

The above-noted needs associated with interconnecting treatment devices are addressed by the presently-disclosed device actuation system for actuating a treatment device. The device actuation system includes a first drive gear rotatably mountable to the treatment device, a coupler rail slidably mountable to the treatment device, a second drive gear rotatably mountable to the coupler rail, and a coupler gear rotatably mountable to the treatment device and engageable with the coupler rail. In addition, the device actuation system includes a drive rail locatable between the first drive gear and the second drive gear of the gear system. The coupler gear is rotatable to move the coupler rail in a manner maintaining the second drive gear in continuous engagement with the drive rail against the first drive gear. The first drive gear and the second drive gear are rotatable in a manner causing at least one of translation and rotation of the treatment device relative to the drive rail.

Also disclosed is a treatment device support assembly for actuating a plurality of treatment devices relative to each other for treating an article surface of an article. The treatment device support assembly includes a plurality of device actuation systems, each configured to interconnect an adjacent pair of treatment devices. Each device actuation system includes a gear system couplable to each treatment device of the adjacent pair of treatment devices. The gear system of each treatment device includes a first drive gear rotatably mountable to the treatment device, a coupler rail slidably mountable to the treatment device, a second drive gear rotatably mountable to the coupler rail, and a coupler gear rotatably mountable to the treatment device and engageable with the coupler rail. The device actuation system further includes a drive rail configured to interconnect the adjacent pair of treatment devices, and is locatable between the first drive gear and the second drive gear of each treatment device of the adjacent pair of treatment devices. For each treatment device of the adjacent pair of treatment devices, the coupler gear is rotatable to move the coupler rail in a manner maintaining the second drive gear in continuous engagement with the drive rail against the first drive gear. In addition, the first drive gear and the second drive gear are rotatable in a manner causing at least one of translation and rotation of the treatment device relative to the drive rail.

Also disclosed is a method of actuating at least one treatment device. The method includes rotating a first drive gear and a second drive gear engaged to opposite sides of a drive rail to cause at least one of translation and rotation of a treatment device relative to the drive rail. The first drive gear is mounted to the treatment device, the second drive gear is mounted to a coupler rail slidably mounted to the treatment device, and the coupler rail is engaged to a coupler gear mounted to the treatment device. The method includes rotating the coupler gear to move the coupler rail in a manner maintaining the second drive gear in continuous engagement with the drive rail.

The features, functions and advantages that have been discussed can be achieved independently in various examples of the present disclosure or may be combined in yet other examples, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 12 is a magnified perspective view of the encircled region of the gear system identified by reference numeral 10 of FIG. 8, and illustrating a drive rail captured between the first drive gear and the second drive gear, and showing the drive rail axis oriented perpendicular to a first-second drive gear axis;

FIG. 13 is a perspective view of the gear system taken along line 13 of FIG. 12, and illustrating the second drive gear motor mounted to the coupler rail, which is slidably engaged to the device frame via a coupler rail slide mechanism;

FIG. 19 is a perspective view of the treatment devices translated into close proximity to each other after the first drive gear and the second drive gear of one of the treatment devices are synchronously rotated at the same speed and in opposite directions to cause translation of the treatment device relative to the drive rail;

FIG. 20 is a front view of the treatment devices of FIG. 19;

FIG. 21 is a perspective view of the treatment devices after rotation relative to each other after the first drive gear and the second drive gear of one of the treatment devices are differentially rotated at different speeds and in the same or opposite directions to at least cause rotation of the treatment device relative to the drive rail;

FIG. 22 is a front view of the treatment devices of FIG. 21;

FIG. 25 is a perspective view of an example of the treatment device system positioned over the nose section of the fuselage;

DETAILED DESCRIPTION

Figure 1:
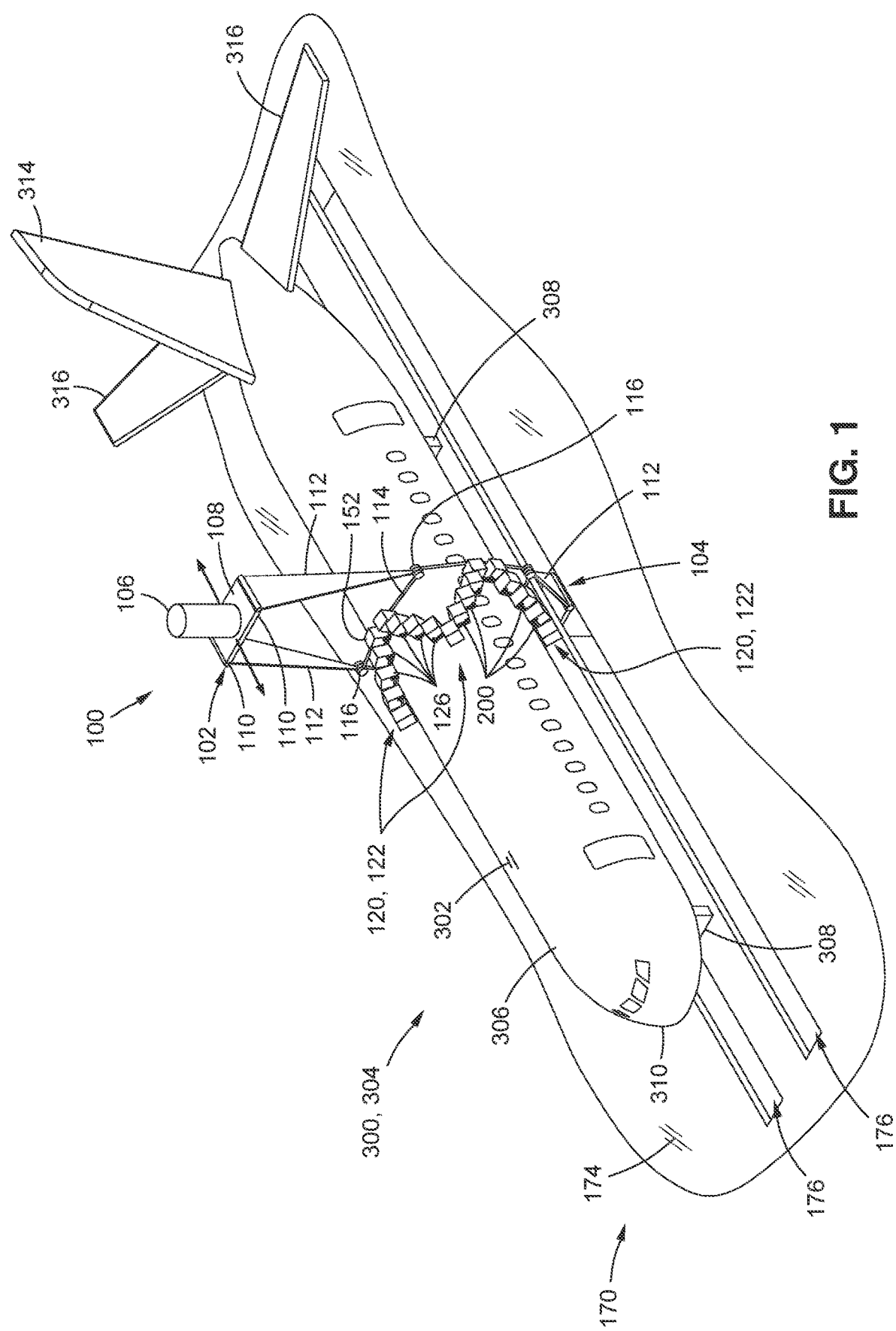
FIG. 1 is a perspective view of an example of a treatment device system comprising a plurality of treatment devices supported by a treatment device support assembly having a plurality of device actuation systems for repositioning the treatment devices complementary to the contour of a fuselage as the treatment device system is moved along the lengthwise direction of the fuselage during the application of a treatment to the fuselage surfaces.
Figure 2:
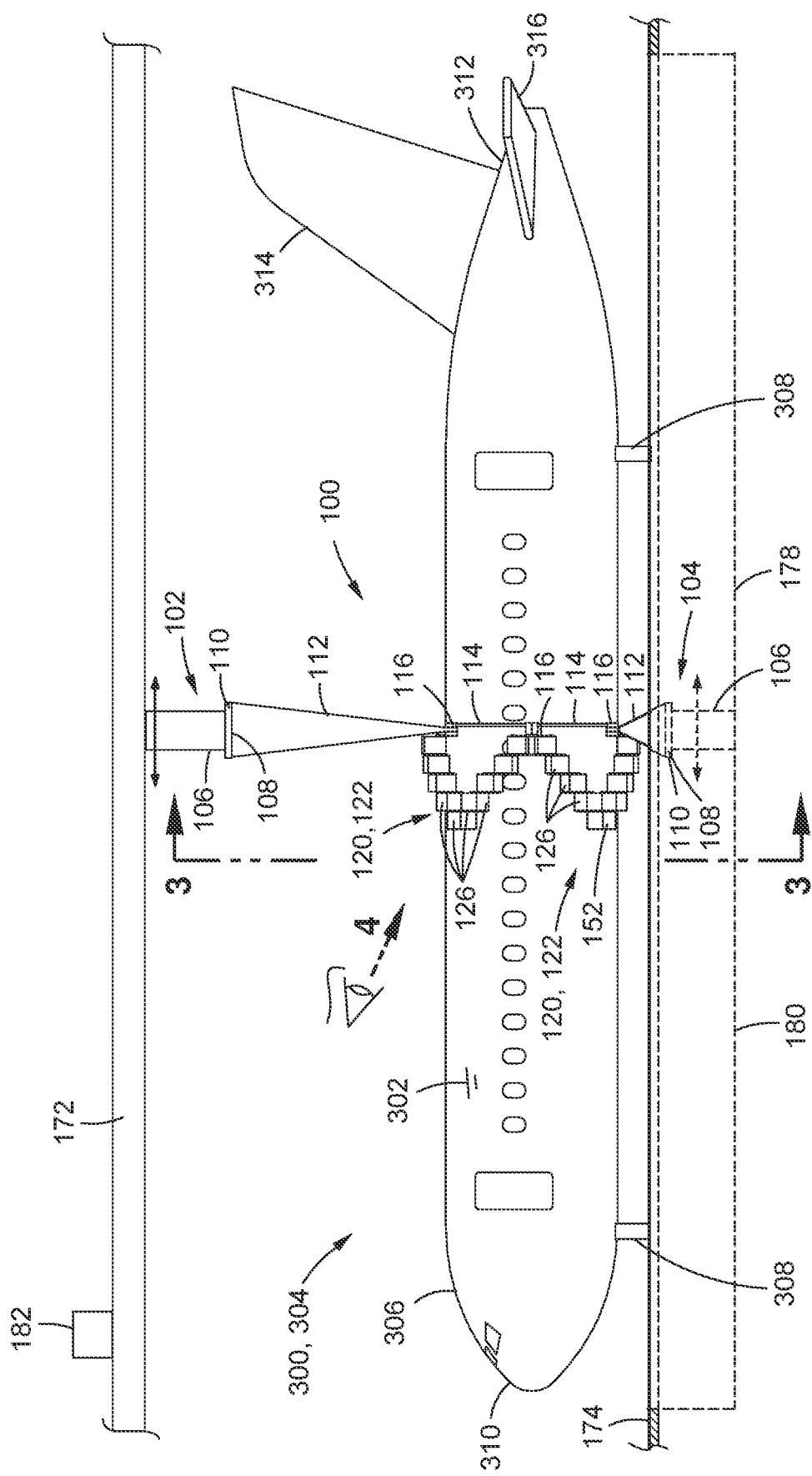
FIG. 2 is a side view of the treatment device system and fuselage of FIG. 1.
Figure 3:
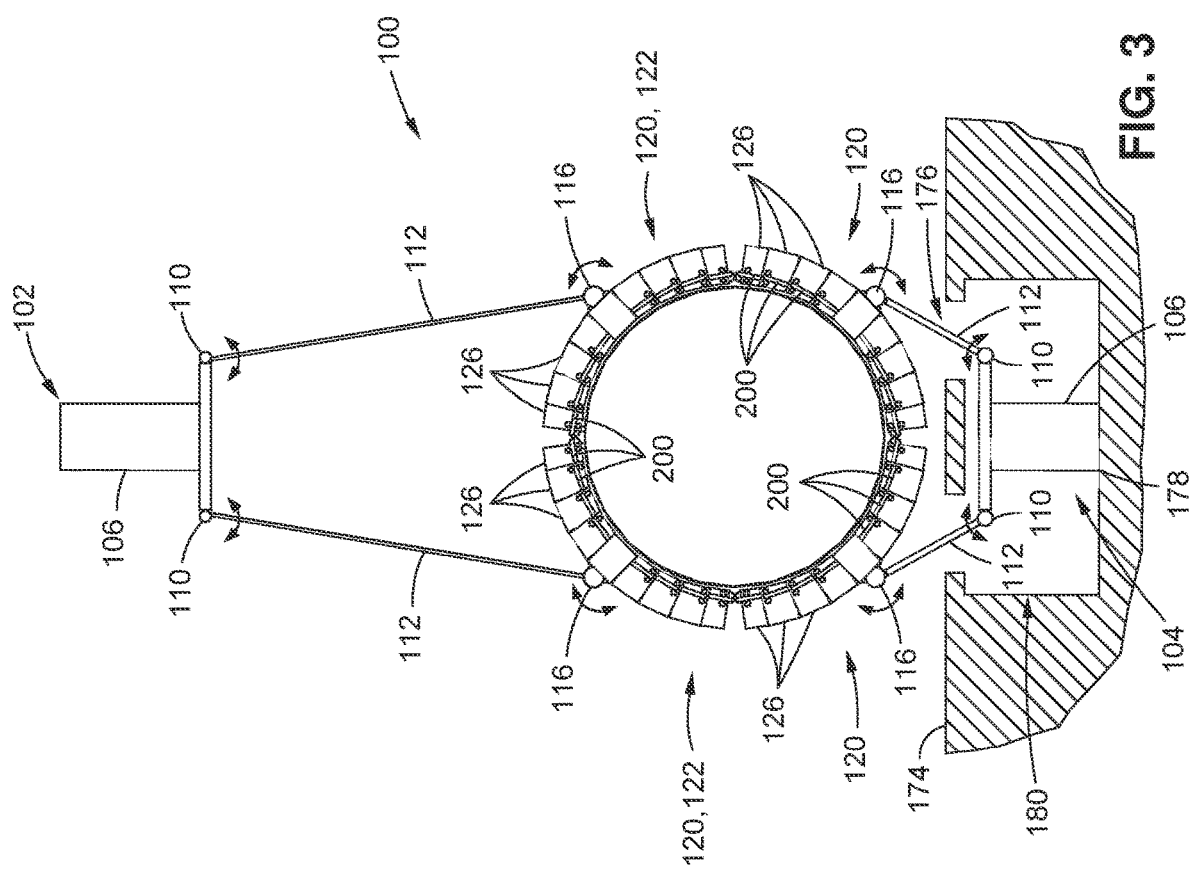
FIG. 3 is a sectional view taken along line 3-3 of FIG. 2, and illustrating an upper treatment device support assembly and a lower treatment device support assembly, each supporting a plurality of treatment devices surrounding the fuselage.

Referring now to the drawings, which illustrate preferred and various examples of the disclosure, shown in FIGS. 1-3 is an example of a treatment device system 100 for treating the article surfaces 302 of an article 300. The treatment device system 100 includes an upper treatment device support assembly 102 and a lower treatment device support assembly 104 for supporting one or more treatment devices 126. In the example shown, the article 300 is a fuselage 306 of an aircraft 304 having a vertical tail 314 and a pair of horizontal tails 316. The fuselage 306 is shown supported on the floor 174 of a treatment facility 170 using fuselage support stands 308.

Figure 9:
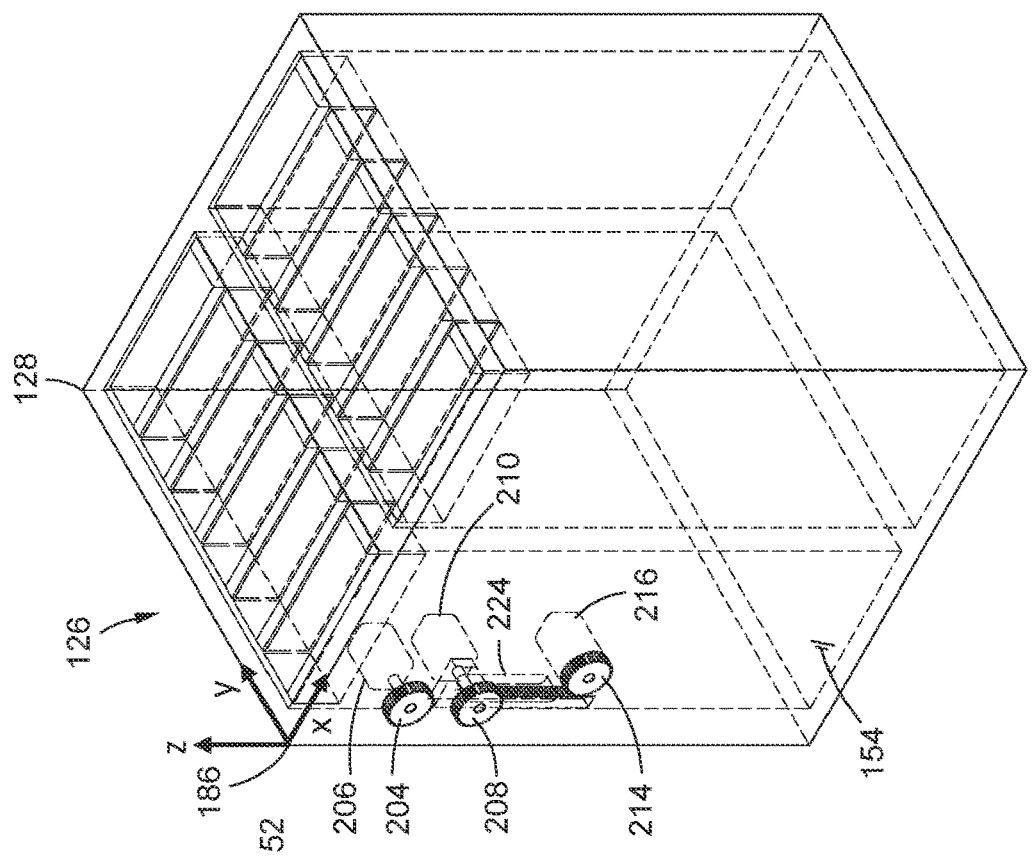
FIG. 9 is a perspective view of the treatment device of FIG. 8 showing in hidden lines a first drive gear motor, a second drive motor, a coupler rail, a coupler gear motor, and a coupler gear of the gear system.
Figure 8:
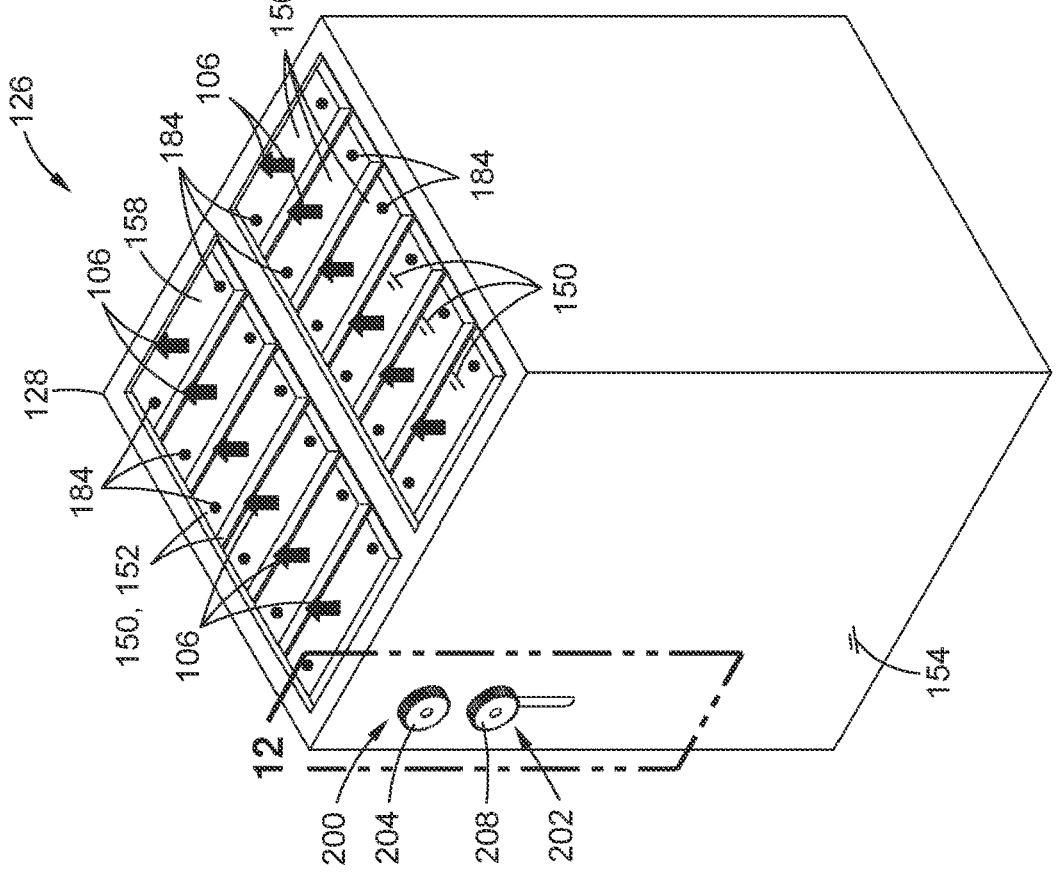
FIG. 8 is a perspective view of an example of a treatment device comprising a device frame supporting a plurality of device heads, and further illustrating a gear system coupled to the device frame.

Each treatment device support assembly 102, 104 includes at least one device actuation system 200 (FIGS. 4-6) for actuating at least one treatment device 126. As described in greater detail below, each device actuation system 200 is configured to translate and/or rotate at least one treatment device 126. In one example, each device actuation system 200 is configured to position a treatment device 126 relative to the changing contours of an article surface 302 over which the treatment device 126 is being moved. In the example of FIGS. 8-9, each treatment device 126 includes a device frame 128, and each treatment device 126 has one or more device heads 150 which are shown arranged in rows and/or columns, and which are supported by the device frame 128.

The treatment devices 126 (e.g., the device heads 150) are configured to dispense a treatment toward and/or onto an article surface 302. The treatment may be a coating, such as a primer, a paint, a clear coat, or a sealant. For painting an article 300 such as the fuselage 306 shown in FIG. 1-3, the treatment devices 126 are configured as inkjet printheads 152 (FIG. 7—e.g., piezoelectric printheads or thermal printheads) each configured to precisely dispense ink onto the surfaces of the fuselage 306 as the treatment devices 126 are moved along the fuselage 306 for printing an aircraft livery. In other examples, the treatment devices 126 may be configured to dispense other types of treatments or substances, such as a solvent, an adhesive, a lubricant, abrasive particles, or any type of gas, liquid, semi-solid, or solid (e.g., particles) substance. In still further examples, the treatment devices 126 may be configured to emit radiation (e.g., electromagnetic radiation) for performing any one of a variety of operations on an article surface 302.

Although described in the context of treating the surfaces of a fuselage 306, the treatment device system 100 may be implemented for treating any one of a variety of different types of articles 300, and is not limited to treating an aircraft 304. For example, the treatment device system 100 may be implemented for treating vehicles, such as ships, trains, or other ground-based motor vehicles such as trucks and automobiles. In addition, the treatment device system 100 may be implemented for treating stationary objects including, but not limited to, buildings, architectural objects, walls, and/or any one of a variety of other types of structures, systems, subsystems, assemblies, or subassemblies.

In FIGS. 1-3, as mentioned above, the treatment device system 100 includes an upper treatment device support assembly 102 and a lower treatment device support assembly 104, each of which has a plurality of device actuation systems 200 for repositioning the treatment devices 126 complementary to the contours of an article 300 (e.g., a fuselage 306) as the treatment device system 100 is moved over the article 300 (e.g., along a lengthwise direction of a fuselage 306) during the application of a treatment to the article surfaces 302. The device actuation systems 200 interconnect the treatment devices 126. In addition, the device actuation systems 200 are configured to actuate the treatment devices 126 relative to each other. As described in greater detail below, each device actuation system 200 is configured to translate and rotate an adjacent pair of treatment devices 126 relative to each other in a manner to maintain each treatment device 126 at a predetermined spacing and orientation relative to the local contour of an article surface 302 as the treatment devices 126 are moved over the article 300.

In the example of FIGS. 1-3, the upper treatment device support assembly 102 includes a central pillar 106 coupled to an overhead gantry 172 (FIGS. 1-3). The fuselage 306 is oriented parallel to the lengthwise direction of the overhead gantry 172, allowing the upper treatment device support assembly 102 to move the treatment devices 126 along the length of the fuselage 306 from the nose section 310 section to the tail section 312. A support structure base 108 is shown coupled to the central pillar 106. On each of opposing sides of the support structure base 108 is a pillar pivot joint 110 coupling an attachment pillar 112 to the support structure base 108. At the lower end of each attachment pillar 112 is an arm pivot joint 116 coupling a pair of attachment arms 114 to the attachment pillar 112. The ends of the attachment arms 114 are respectively coupled via arm pivot joints 116 to opposite sides of an array 120 of treatment devices 126 which, as indicated above, are interconnected by a plurality of device actuation systems 200. In the example shown, the upper treatment device support assembly 102 supports two arrays 120 of treatment devices 126 in side-by-side arrangement.

In FIGS. 1-3, the lower treatment device support assembly 104 is configured similar to the upper treatment device support assembly 102. For example, the lower treatment device support assembly 104 includes a central pillar 106 which is supported on a pit gantry 178 mounted in a pit 180 that extends along a lengthwise direction below the floor 174 in parallel to the overhead gantry 172. As shown in FIGS. 2-3, a support structure base 108 is mounted on the upper end of the central pillar 106. A pair of pillar pivot joints 110 on opposite sides of the support structure base 108 respectively couple a pair of attachment pillars 112 to the support structure base 108. The attachment pillars 112 extend upwardly through a pair of floor openings 176. At the upper end of each attachment pillar 112 is an arm pivot joint 116 coupling a pair of attachment arms 114 to the attachment pillar 112. The ends of the pair of attachment arms 114 extending from each attachment pillar 112 are coupled to opposite sides of an array 120 of treatment devices 126. The lower treatment device support assembly 104 supports two arrays 120 of treatment devices 126 in side-by-side arrangement.

Figure 4:
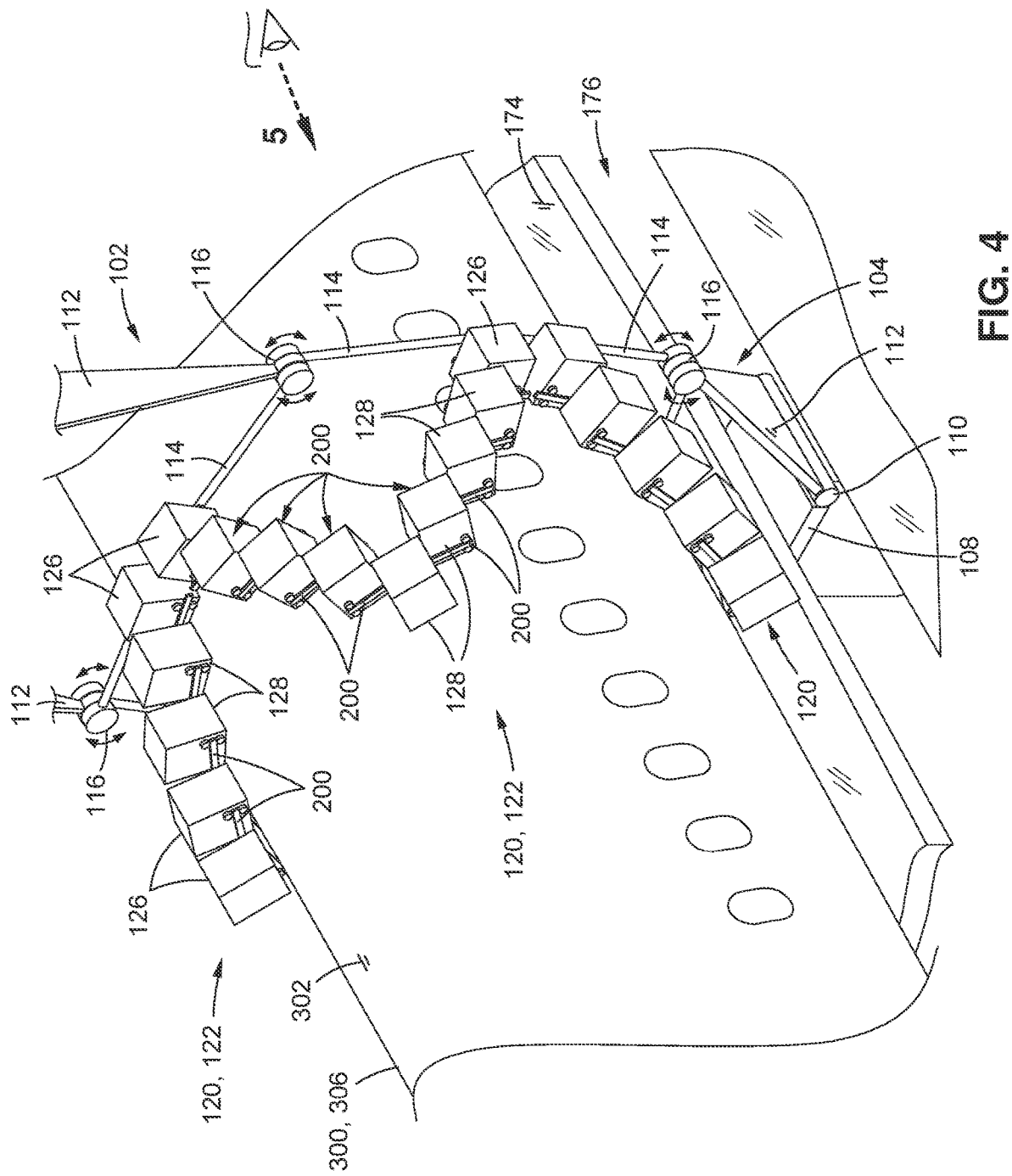
FIG. 4 is a magnified view of the encircled region identified by reference numeral 4 of FIG. 2, and illustrating a plurality of treatment devices interconnected by a plurality of device actuation systems.
Figure 5:
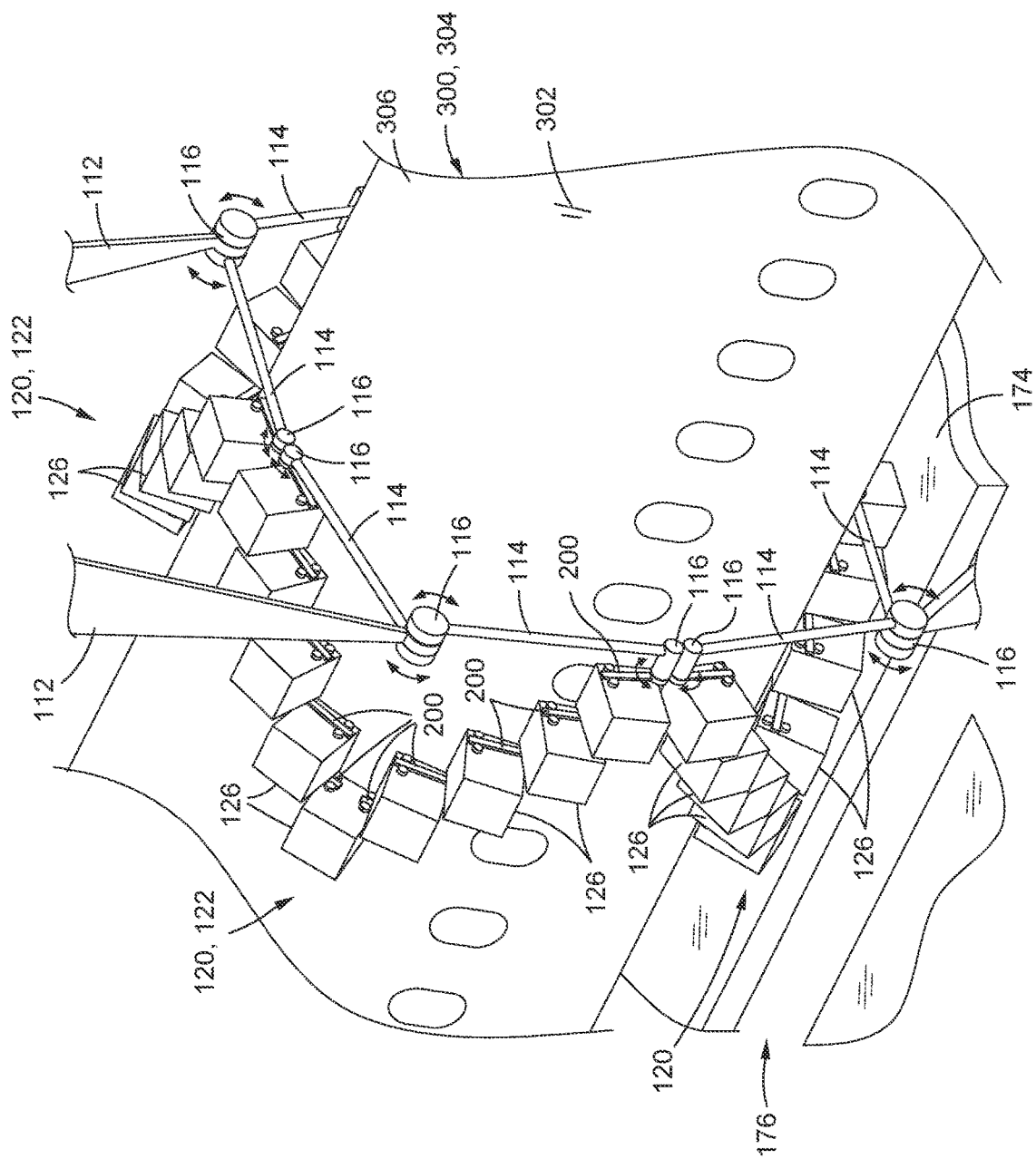
FIG. 5 is an aft perspective view of the fuselage and the treatment device system taken along line 5 of FIG. 4, and illustrating the treatment devices interconnected by the plurality of device actuation systems.
Figure 6:
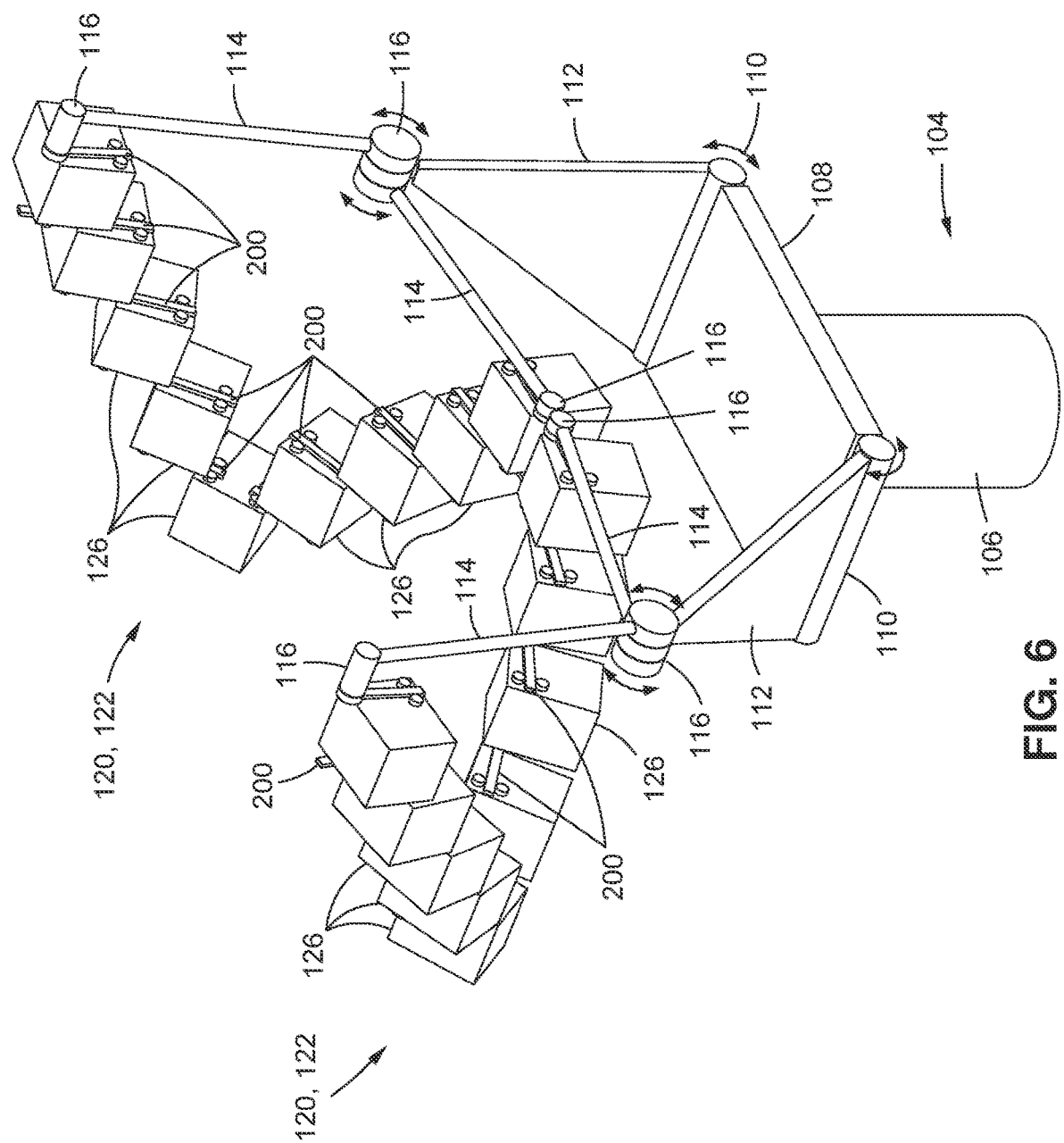
FIG. 6 is a perspective view of an example of a lower treatment device support assembly supporting a pair of frame arrays, each comprising a plurality of treatment devices interconnected by a plurality of device actuation systems.

Referring to FIGS. 4-6, shown are two arrays 120 of treatment devices 126 supported by the upper treatment device support assembly 102, and two arrays 120 of treatment devices 126 supported by the lower treatment device support assembly 104. Also shown are the device actuation systems 200 interconnecting the treatment devices 126 of each array 120. FIGS. 4-5 show the treatment devices 126 positioned and oriented complementary to the local contour of the fuselage 306. Toward this end, the attachment pillars 112 are rotatable about the pillar pivot joints 110. In addition, the attachment arms 114 are rotatable about the arm pivot joints 116. The pivotability of the attachment pillars 112 and attachment arms 114 allows the arrays 120 of treatment device 126 to be positioned complementary to a variety of articles 300 of different sizes and shapes. The device actuation systems 200 are configured to translate and rotate the treatment devices 126 relative to each other in a manner maintaining each treatment device 126 at a predetermined distance and orientation relative to the local contour of an article surface 302 over which the treatment devices 126 are being moved while dispensing a treatment.

Figure 7:
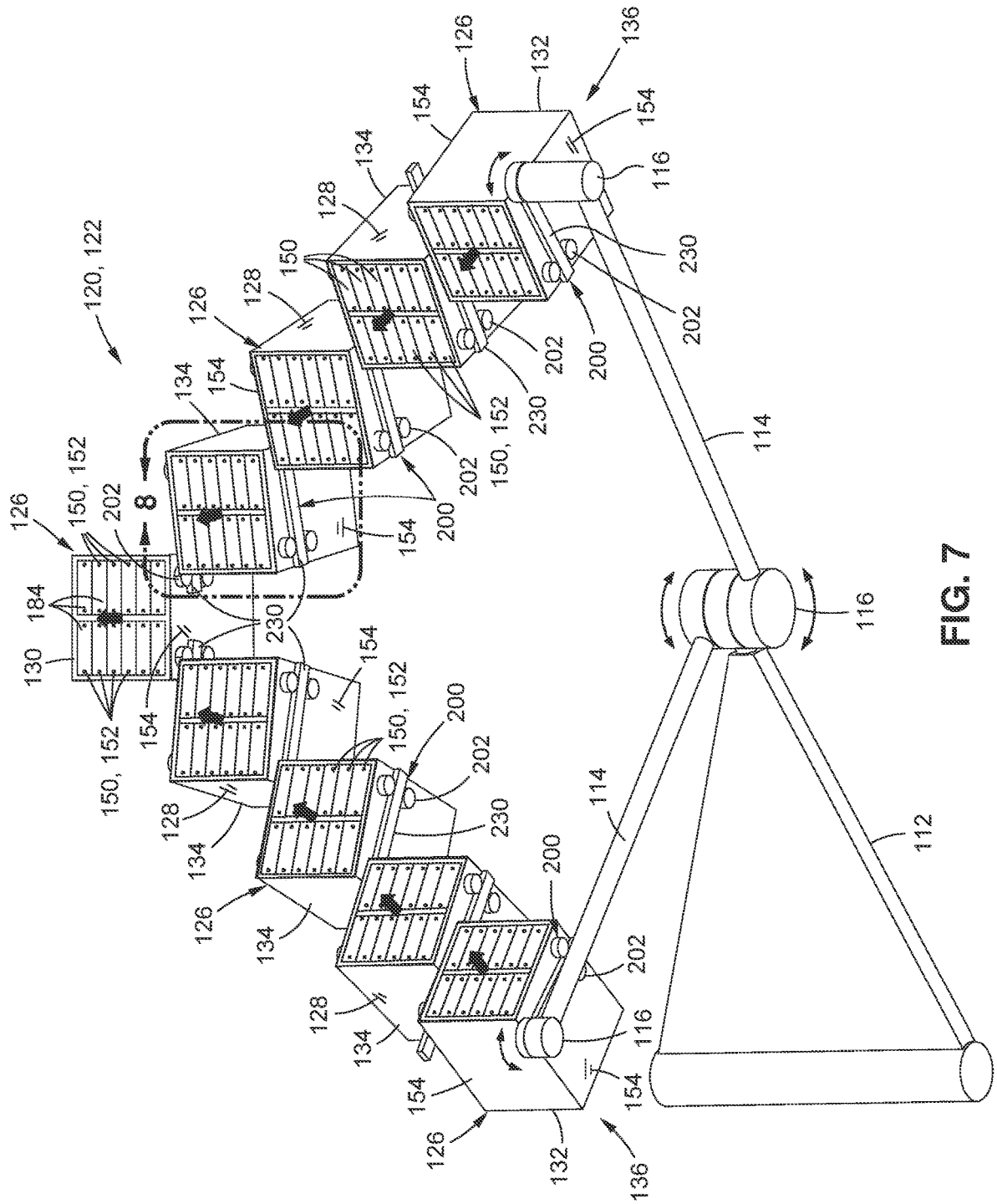
FIG. 7 is a perspective view of an example of an array of treatment devices interconnected by a plurality of device actuation system, and illustrating the array in an expanded configuration that is complementary to the contour of the article surface.

Referring to FIG. 7, shown is a single array 120 of treatment devices 126 of the lower treatment device support assembly 104. The array 120 is supported on opposite ends respectively by the pair of attachment arms 114. The lower treatment device support assembly 104 includes a plurality of device frames 128 respectively of the plurality of treatment devices 126. Each device frame 128 is configured to support one or more device heads 150 which, in the configuration shown, are arranged in rows and columns within each device frame 128.

In FIG. 7, the array 120 of device frames 128 includes an apex device frame 130 at the intersection of two device frame rows 136. Each device frame row 136 terminates at an end device frame 132, which is coupled to an attachment arm 114 via a device actuation system 200 that is coupled to an arm pivot joint 116. In addition, each device frame row 136 includes one or more intermediate device frames 134 between the apex device frame 130 and the end device frame 132. Although each device frame row 136 in FIG. 7 has three intermediate device frames 134, a treatment device support assembly may be provided with any number of intermediate device frames 134 between the apex device frame 130 and the end device frame 132, including a single intermediate device frame 134 between the apex device frame 130 and the end device frame 132. Alternatively, a treatment device support assembly may be devoid of intermediate device frames 134, and may include only a pair of end device frames 132 each coupled to an apex device frame 130 via a pair of device actuation systems 200.

The device actuation systems 200 interconnecting the device frames 128 are configured to move the device frames 128 of the treatment devices 126 between an expanded configuration 122 and a contracted configuration 124 (FIGS. 28-29), and to any configuration in between, to allow the treatment devices 126 to be repositioned and reoriented to match the local size and shape (e.g., curvature) of an article surface 302 (FIG. 4). In the expanded configuration 122, the intermediate device frames 134 and the end device frame 132 respectively in the two device frame rows 136 are spaced farther apart from each other than in the contracted configuration 124 (e.g., FIGS. 28-29). In addition, in the expanded configuration 122, the device frame rows 136 are non-parallel to each other. In FIG. 7, the array 120 of treatment devices 126 has a V-shaped configuration. However, the treatment devices 126 may be arranged in any one of a wide variety of configurations, and are not limited to a V-shaped configuration.

In the semi-contracted or contracted configuration 124 (FIGS. 28-29), at least one pair of device frames 128 respectively of the device frame rows 136 are in close proximity to each other. In an example not shown, the device frame rows 136 in the contracted configuration 124 may be generally parallel to each other. In the contracted configuration 124, at least one pair of treatment devices 126 are positioned in close side-by-side proximity to each other, similar to the arrangement shown in FIGS. 28-29 as described below.

Referring to FIGS. 7-8, each of the device actuation systems 200 interconnecting the device frames 128 includes at least one gear system 202 (FIGS. 8-11) and a drive rail 230 (FIGS. 12-15). In this regard, at least one gear system 202 is coupled to each device frame 128. In the example of FIG. 7, each one of the end device frames 132 has a gear system 202 mounted to opposing lateral sides 154 of the end device frame 132. Likewise, each one of the intermediate device frames 134 has a gear system 202 mounted to opposing lateral sides 154 of the intermediate device frame 134. The apex device frame 130 has a pair of gear systems 202 mounted to the same lateral side 154, and is devoid of gear systems 202 on the opposite lateral side 154 of the apex device frame 130.

In FIG. 7, each of the end device frames 132 is coupled to an arm pivot joint 116 by a drive rail 230 extending from the gear system 202 mounted one of the lateral sides 154 of the end device frame 132. The gear system 202 on the opposite lateral side 154 of each end device frame 132 is coupled to the gear system 202 of an intermediate device frame 134 via a drive rail 230. Likewise, each gear system 202 on the opposing lateral sides 154 of each intermediate device frame 134 is coupled to the gear system 202 of an immediately-adjacent intermediate device frame 134 via a drive rail 230. In this regard, the gear systems 202 respectively of adjacent pairs of treatment devices 126 are respectively mounted to the lateral sides 154 that generally face each other, thereby allowing adjacent pairs of treatment devices 126 to be interconnected by a drive rail 230, and allowing the treatment devices 126 to be translated and rotated relative to each other such that at least a portion of the lateral sides 154 of the adjacent pair of treatment devices 126 directly face each other.

As a result of the arrangement of treatment devices 126 in the array 120 of FIG. 7, when the device treatment system (FIG. 1) is moved along a lengthwise direction of an article 300 (FIGS. 1-3), a treatment band (not shown) dispensed by each treatment device 126 onto an article surface is capable of at least partially overlapping the treatment band (not shown) dispensed by an immediately adjacent treatment device 126, thereby avoiding lengthwise gaps (not shown) between adjacent treatment bands that would otherwise occur if the array 120 of treatment devices 126 were arranged in a non-overlappable manner. In the context of printing an aircraft livery on a fuselage 306 (e.g., FIGS. 1-3) wherein the treatment devices 126 are inkjet printheads 152, the arrangement shown in FIG. 7 allows for the image band (not shown) printed by each inkjet printhead 152 onto the fuselage surface to be aligned in non-gapping and/or non-overlapping relation to the image band printed by an immediately adjacent inkjet printhead 152 as the treatment device system 100 moves the array of inkjet printheads 152 along the length of the fuselage 306. By printing adjacent image bands in non-gapping and/or non-overlapping relation to each other, the aesthetic quality of the aircraft livery is improved relative to the quality of aircraft liveries applied using the above-described conventional methods.

Referring still to FIG. 7, the treatment device system 100 includes a controller 182 (FIG. 8) for controlling the movement of the components of the upper and lower treatment device support assemblies 102, 104. In this regard, the controller 182 controls the pivoting of the attachment pillars 112 about the pillar pivot joints 110, and the pivoting of the attachment arms 114 about the arm pivot joints 116 to allow the arrays 120 of treatment devices 126 to accommodate articles 300 of different sizes and shapes. In addition, the controller 182 controls the device actuation systems 200 interconnecting the treatment devices 126 in a manner to adjust the position and orientation of the treatment devices 126 relative to each other for accommodating the article shape.

The upper and lower treatment device support assemblies 102, 104 may include one or more sensors 184 mounted to one or more of the device frames 128. The sensors 184 may be provided as imaging devices (e.g., cameras), laser scanners, or other metrology devices configured to sense the article surface 302. Each sensor 184 is configured to continuously scan the topography of the article surface 302 (FIGS. 1-3) as the treatment devices 126 are moved over the article 300 (FIGS. 1-3), and continuously generate surface data representative of the local contour of the article surface 302. For example, one or more sensors 184 on each treatment device 126 continuously senses the distance between a dispensing side 158 of each treatment device 126 and the article surface 302, in addition to sensing the orientation of the treatment device 126 relative to the local contour of the article surface 302. For example, the sensors 184 of each treatment device 126 continuously sense the orientation of a nominal dispensing direction 160 of the treatment device 126 relative to the local contour of the article surface 302.

The nominal dispensing direction 160 of a treatment device 126 may be described as the direction along which a treatment is dispensed from a dispensing side 158 of the treatment device 126. For examples of treatment devices 126 in which the orientation (e.g., pitch or yaw) of the individual device heads 150 is adjustable (not shown), the dispensing direction 160 is the direction along which the treatment is dispensed prior to any such pitch and/or yaw adjustment of the device heads 150.

The sensors 184 (FIG. 8) of the treatment devices 126 continuously transmit surface data to the controller 182 (FIG. 2). The controller 182 processes the surface data provided by the sensors 184 and controls the device actuation systems 200 (FIG. 7) in a manner to continuously adjust the position of the treatment devices 126 (FIG. 7) to thereby maintain the dispensing side 158 (FIG. 8) or dispensing face of the treatment devices 126 within a tolerance band (e.g., ±0.010 inch) of a predetermined distance (e.g., up to 0.20 inch) from the article surface 302 (FIGS. 1-3). Additionally, the controller 182 controls the device actuation systems 200 in a manner to continuously adjust the orientation of the treatment devices 126 to thereby maintain the nominal dispensing direction 160 (FIG. 8) of each treatment device 126 within a predetermined tolerance band (e.g., ±5 degrees) of a desired orientation (e.g., locally normal or perpendicular) relative to the article surface 302. In this regard, the controller 182 controls the operation of each gear system 202 in a manner to adjust the position and orientation of the treatment devices 126 relative to the article surface 302 as needed to maintain the treatment devices 126 complementary to the article surface 302 as the treatment devices 126 are moved over the article 300 while dispensing the treatment toward the article surface 302.

Referring to FIGS. 8-15, shown is an example of a treatment device 126. As mentioned above, the device frame 128 of each treatment device 126 has a dispensing direction 160 along which the treatment device 126 dispenses a treatment from a dispensing side 158 of the treatment device 126. In the example shown, treatment device 126 has an orthogonal shape, and the lateral sides 154 of the device frame 128 are parallel to the dispensing direction 160. However, a treatment device 126 may be provided with a non-orthogonal shape, and/or the lateral sides 154 may be non-parallel to the dispensing side 158 of the treatment device 126. The device frame 128 is configured to support a plurality of device heads 150. In one example, each of the device heads 150 may be provided as an inkjet printhead 152 configured to dispense ink (i.e., the treatment) along the dispensing direction 160. Each device frame 128 is configured to support one or more rows and/or one or more columns of inkjet printheads 152. However, the device heads 150 may be provided in alternative configurations, and are not limited to inkjet printheads 152, as mentioned above.

For purposes of illustrating the arrangement and operation of the device activation system, FIGS. 8-11 show a simplified version of a treatment device 126 having a single gear system 202. However, as shown in FIG. 7, each treatment device 126 in an array 120 may have two gear systems 202, including one gear system 202 on one lateral side 154 of the device frame 128, and another gear system 202 on an opposite lateral side 154 of the device frame 128. Alternatively, as shown in FIG. 7, the apex device frame 130 in an array 120 has two gear systems 202 on the same lateral side 154.

In FIGS. 8-15, the gear system 202 of the device actuation system 200 includes a first drive gear 204, a coupler rail 224, a second drive gear 208, and a coupler gear 214. The first drive gear 204, the second drive gear 208, and the coupler gear 214 are independently rotatably driven respectively by a first drive gear motor 206, a second drive gear motor 210, and a coupler gear motor 216, under control of the controller 182 (FIG. 2). In the example shown, the first drive gear motor 206, the second drive gear motor 210, and the coupler gear motor 216 are electric servomotors.

The first drive gear 204 is rotatably mounted to the treatment device 126. More specifically, the first drive gear motor 206 is mounted to a lateral side 154 of the device frame 128 in an interior of the device frame 128. The first drive gear motor 206 includes a shaft (not shown) that extends to the exterior of the device frame 128 through a hole (not shown) in the lateral side 154. The first drive gear 204 is mounted on the shaft of the first drive gear motor 206.

The coupler rail 224 is slidably mounted to the device frame 128 of the treatment device 126. In the example of FIGS. 12-15, the coupler rail 224 is slidably mounted to the lateral side 154 in the interior of the device frame 128 via a coupler rail slide mechanism 238. In the example shown, the coupler rail slide mechanism 238 comprises a slide channel formed in the coupler rail 224, and which slides along a slide rail located on the lateral side 154 of the device frame 128. However, the coupler rail slide mechanism 238 may be provided in any one of a variety of alternative configurations allowing sliding motion of the coupler rail 224 relative to the device frame 128.

The coupler gear 214 is rotatably mounted to the treatment device 126. More specifically, the coupler gear motor 216 is mounted to the device frame 128 in an interior of the device frame 128. The coupler gear motor 216 may be supported by a bracket (not shown) mounted to the lateral side 154 of the device frame 128. The coupler gear motor 216 includes a shaft (not shown) upon which the coupler gear 214 is mounted. The coupler gear 214 has gear teeth 228 that are in continuous meshing engagement with the rail teeth 226 of the coupler rail 224.

The second drive gear 208 is rotatably mounted to the coupler rail 224. More specifically, the second drive gear motor 210 is mounted to the coupler rail 224. The second drive gear motor 210 includes a shaft (not shown) that extends to the exterior of the device frame 128 through a hole (not shown) in the coupler rail 224, and through a frame slot 156 in the lateral side 154. The second drive gear 208 is mounted on the shaft of the second drive gear motor 210.

As shown in FIGS. 12-15, a drive rail 230 is located between the first drive gear 204 and the second drive gear 208 of the treatment device 126. The first drive gear 204 and the second drive gear 208 have gear teeth 228 configured to engage or mesh with the rail teeth 226 of the drive rail 230. In FIG. 7, a plurality of the drive rails 230 interconnect adjacent pairs of the treatment devices 126. Each drive rail 230 is captured between the first drive gear 204 and the second drive gear 208 respectively of the treatment device 126 of each adjacent pair. For each treatment device 126, the coupler gear 214 is rotated to move the coupler rail 224 in a manner moving the second drive gear 208 toward or away from the first drive gear 204, to thereby maintain the second drive gear 208 in continuous engagement with the drive rail 230 against the first drive gear 204.

Figure 16:
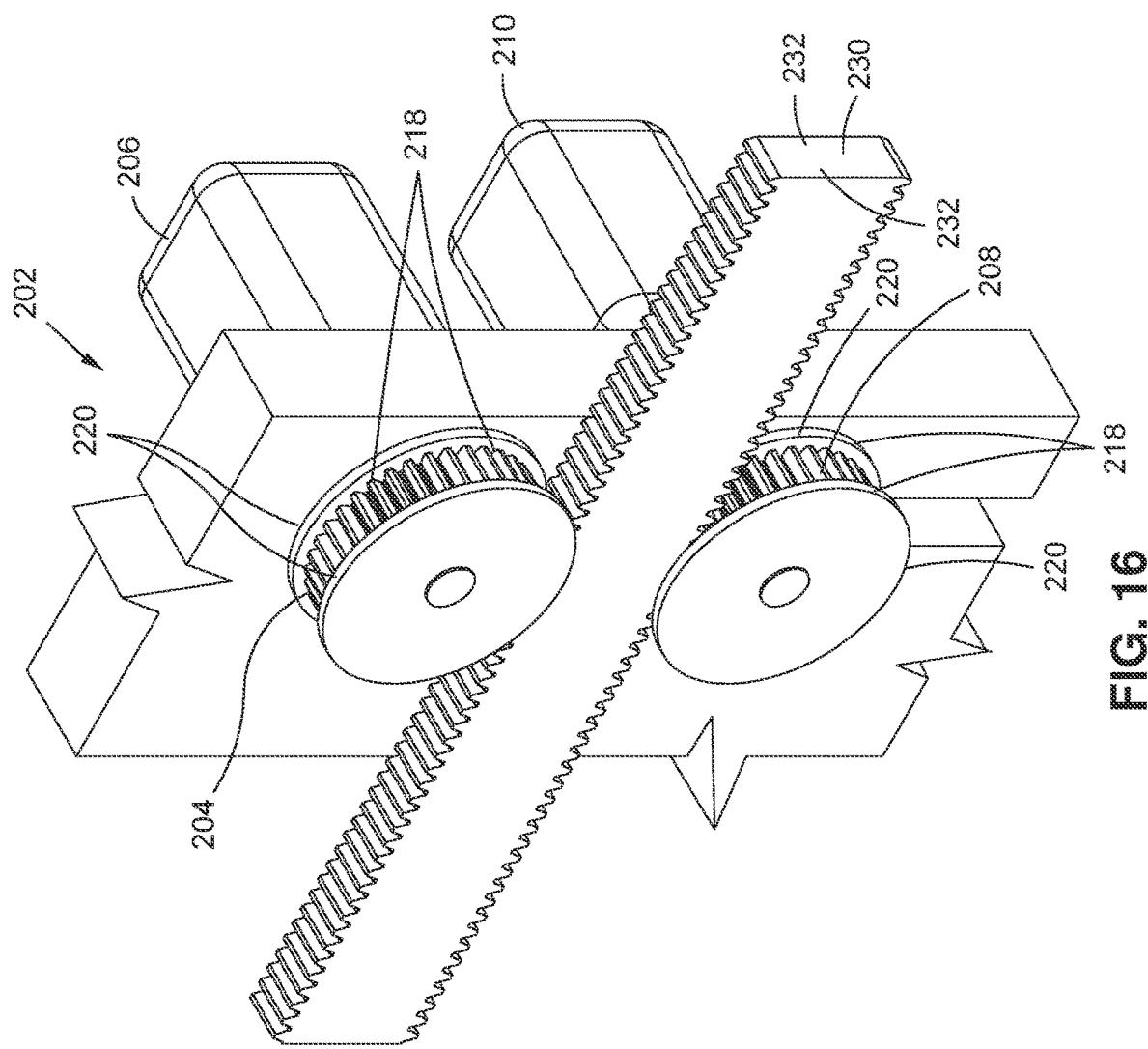
FIG. 16 is a perspective view of an example of the gear system in which the first drive gear and the second drive gear each have a pair of circumferential ridges for maintaining the drive rail in alignment with the first drive gear and the second drive gear.

Referring to FIG. 16, shown is a first drive gear 204 and a second drive gear 208 in an alternative example of a gear system 202. The drive rail 230 has opposing rail sides 232 that define a rail width. The first drive gear 204 and the second drive gear 208 each have a pair of gear sides 218. The gear sides 218 of the first drive gear 204 and the second drive gear 208 each have circumferential ridges 220 that are spaced apart by a distance that is approximately equal to (i.e., but not less than) the rail width. The circumferential ridges 220 are sized to extend over the rail sides 232, to thereby maintain the drive rail 230 in alignment with the first drive gear 204 and the second drive gear 208. In this regard, the circumferential ridges 220 prevent the drive rail 230 from moving laterally out of alignment with the first drive gear 204 and second drive gear 208. The circumferential ridges 220 may be integrated into the first drive gear 204 and the second drive gear 208, or each circumferential ridge 220 may be part of a disc-shaped member (not shown) that is mounted against the gear sides 218 of the first drive gear 204 and second drive gear 208.

In the illustrated examples, the drive rail 230 is straight. However, in other examples not shown, the drive rail 230 may be slightly curved. Likewise, the coupler rail 224 may be provided in a slightly curved arrangement as an alternative to the straight shape shown in the figures. In the example shown, the first drive gear 204, the coupler rail 224, the coupler gear 214, and the second drive gear 208 have outer diameters that are equivalent to each other. However, in other examples, the first drive gear 204, the coupler rail 224, the coupler gear 214 may have different outer diameters.

In the example of FIGS. 7-15, the first drive gear 204, the second drive gear 208, and the drive rail 230 are external to the device frame 128. The coupler rail 224 and the coupler gear 214 are internal to the device frame 128, and are non-protruding from the lateral side 154 of the device frame 128. Advantageously, mounting the coupler rail 224 and coupler gear 214 inside the treatment device 126 provides for a compact form factor, allowing an array 120 of treatment devices 126 to be packaged in close proximity to each other.

Figure 11:
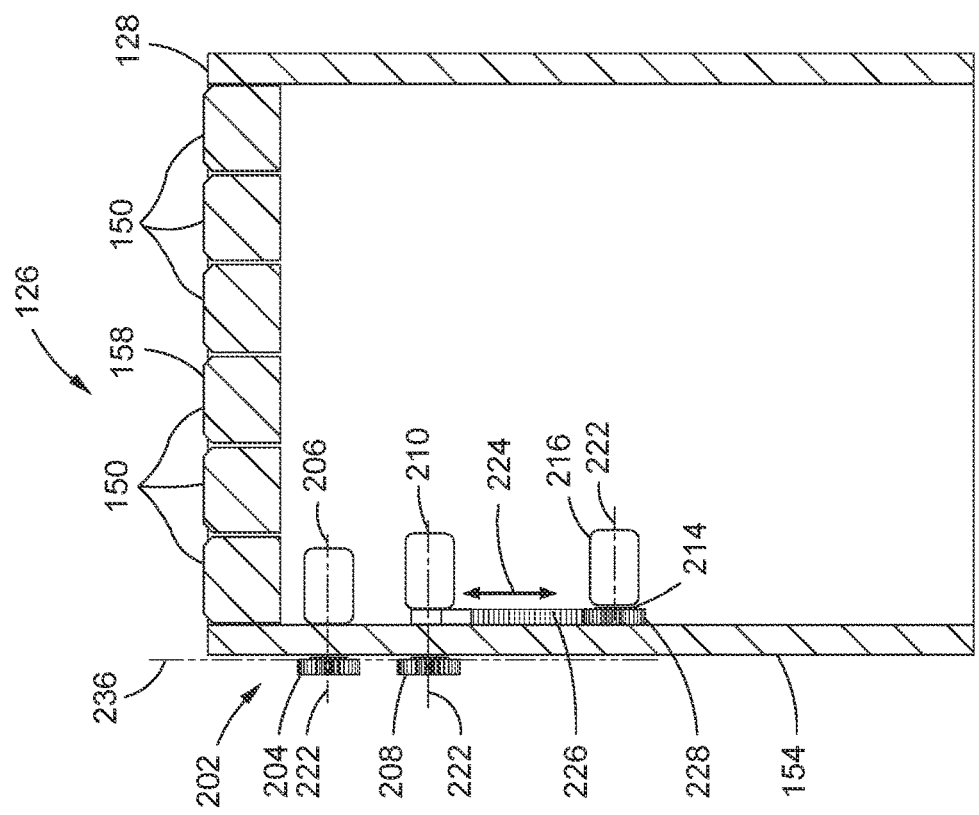
FIG. 11 is a sectional view taken along line 11-11 of FIG. 10, and illustrating the gear system which comprises a first drive gear driven by the first drive gear motor, a coupler rail slidably mounted to the device frame, a second drive gear driven by the second drive gear motor and mounted to the coupler rail, and a couple gear rotatably mounted to the treatment device and engaged to the couple rail.
Figure 10:
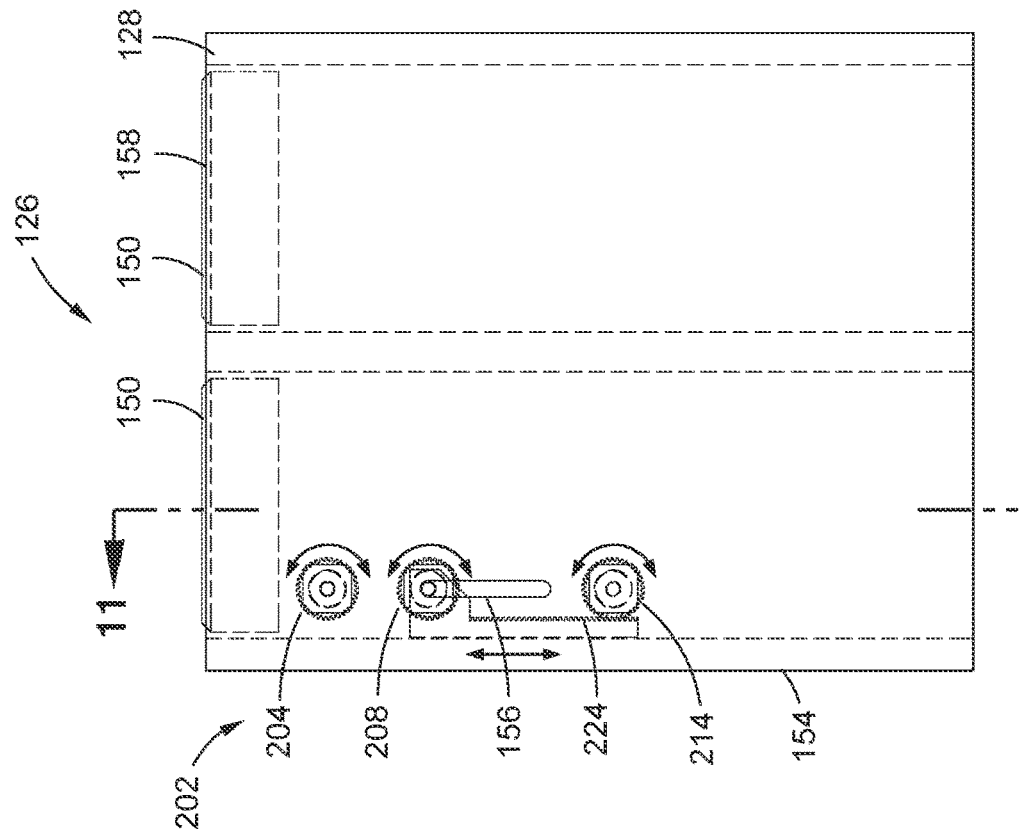
FIG. 10 is a side view of the treatment device of FIG. 8.
Figure 15:
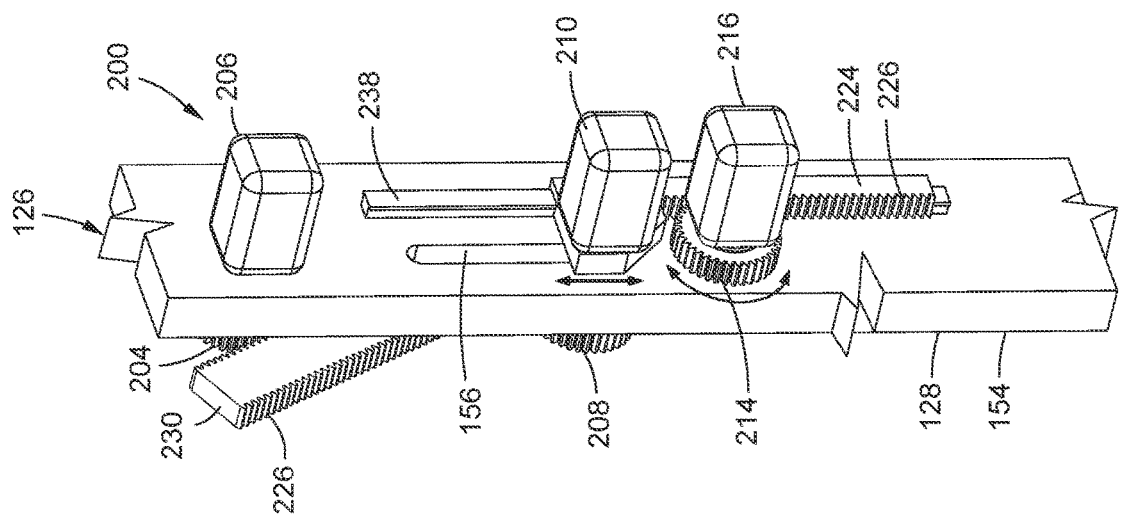
FIG. 15 is a perspective view of the gear system taken along line 15 of FIG. 14 showing the coupler rail and the second drive gear moved away from the first drive gear.
Figure 14:
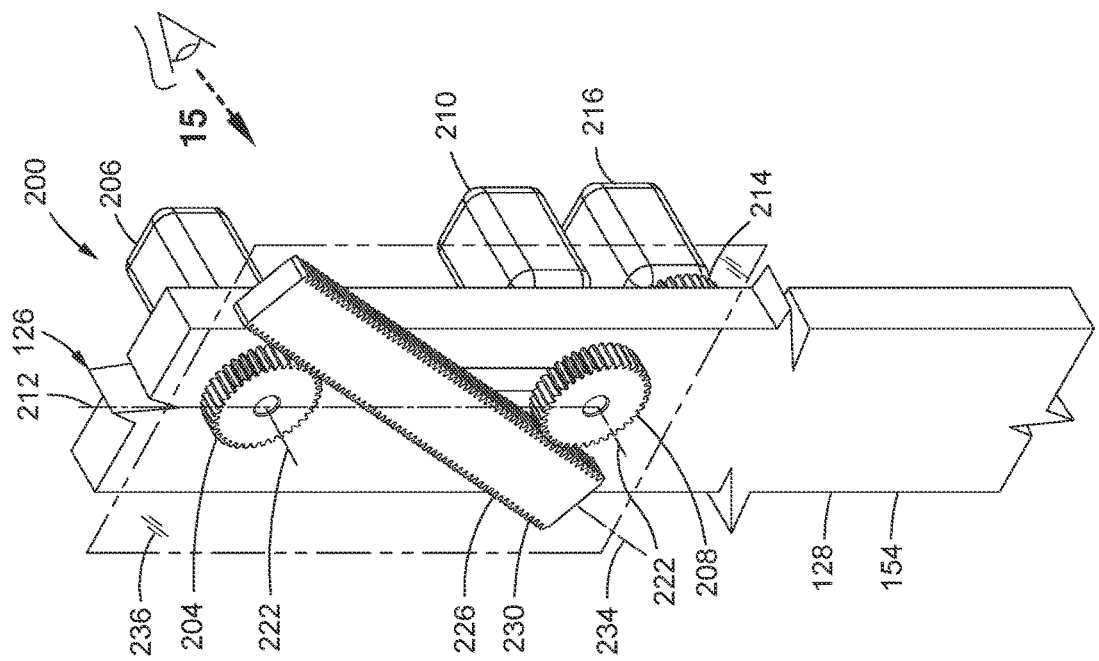
FIG. 14 is a perspective view of the device actuation system of FIG. 12 showing the second drive gear moved away from the first drive gear, and showing the drive rail axis oriented non-perpendicular to the first-second drive gear axis.

In FIGS. 11 and 14, the drive rail 230 defines a plane of rotation 236 during actuation (e.g., rotation) of the treatment device 126. In the example shown, the plane of rotation 236 is parallel to the dispensing direction 160 (FIG. 8). The coupler gear 214 and the coupler rail 224 are located inside the inside the device frame 128, and are therefore outside of the plane of rotation 236, which advantageously increases the angular range of rotation of the treatment device 126, relative to a reduced angular range of rotation of a treatment device 126 in an arrangement (not shown) in which the coupler gear 214 and the coupler rail 224 protrude into the plane of rotation 236. However, in other examples not shown, the coupler rail 224 and the coupler gear 214 may be external to the device frame 128, and/or the coupler rail 224 and the coupler gear 214 may protrude through the plane of rotation 236.

As shown in the example of FIGS. 8-11, the gear system 202 is couplable to the lateral side 154 of the device frame 128 in a manner such that the coupler rail 224 is generally parallel to the dispensing direction 160 (FIG. 8) of the treatment device 126, and perpendicular to the dispensing side 158 (FIG. 8) of the treatment device 126. However in other examples, the gear system 202 may be configured such that the coupler rail 224 is non-parallel to the dispensing direction 160 of the treatment device 126.

As shown in FIG. 11, the first drive gear 204, the second drive gear 208, and the coupler gear 214 have rotational axes 222 that are parallel to each other, and are oriented in the same direction. However, in another example (not shown), the rail teeth 226 of the coupler rail 224 may be located on a side of the coupler rail 224 opposite the lateral side 154 of the device frame 128, and the rotational axis 222 of the coupler gear 214 may be oriented perpendicular to the rotational axes 222 of the first drive gear 204 and the second drive gear 208 to enable the gear teeth 228 of the coupler gear 214 to engage the rail teeth 226 of the coupler rail 224. FIG. 9 shows a reference coordinate system 186 having an x-axis, a y-axis, and a z-axis. The device actuation system 200 is configured to translate and rotate the treatment device 126 along a direction parallel to the x-z plane of the reference coordinate system 186.

Referring to FIGS. 12 and 14, the drive rail 230 has a drive rail axis 234 extending along a lengthwise direction of the drive rail 230. As mentioned above, the first drive gear 204 and the second drive gear 208 each have a rotational axis 222 (FIG. 11). As shown in FIG. 12, the gear system 202 includes a first-second drive gear axis 212 that passes through the rotational axis 222 of the first drive gear 204 and the rotational axis 222 of the second drive gear 208. In the example shown, the gear system 202 is coupled to the treatment device 126 such that when the drive rail axis 234 is perpendicular to the dispensing direction 160 (FIG. 8) of the treatment device 126, the first-second drive gear axis 212 is parallel to the dispensing direction 160. In Figure eight, when the dispensing direction 160 is vertically upward, the first drive gear 204 and the second drive gear 208 are vertically aligned.

During operation of each device actuation system 200, the coupler gear motor 216 is operated by the controller 182 in a manner to rotate the coupler gear 214 for moving the coupler rail 224 in a manner maintaining the second drive gear 208 in continuous engagement with the drive rail 230 against the first drive gear 204. The first drive gear motor 206 and the second drive gear motor 210 are respectively operated by the controller 182 in a manner to respectively rotate the first drive gear 204 and the second drive gear 208 to cause translation and/or rotation of the treatment device 126 relative to the drive rail 230. In this regard, the first drive gear motor 206 and the second drive gear motor 210 are operated in a manner to position and orient the treatment device 126 complementary to the contour of the article surface 302. During rotation of the treatment device 126 relative to the drive rail 230, the coupler gear 214 is rotated in a manner to maintain the gear teeth 228 of the second drive gear 208 in continuous engagement with the rail teeth 226 on one side of the drive rail 230, while the rail teeth 226 on the opposite side of the drive rail 230 are in continuous engagement with the gear teeth 228 of the first drive gear 204. The controller 182 coordinates the timing and direction of rotation of the first drive gear motor 206, the second drive gear motor 210, and the coupler gear motor 216 in a manner to adjust the position and orientation of the treatment device 126 relative to the article surface 302.

Figure 17:
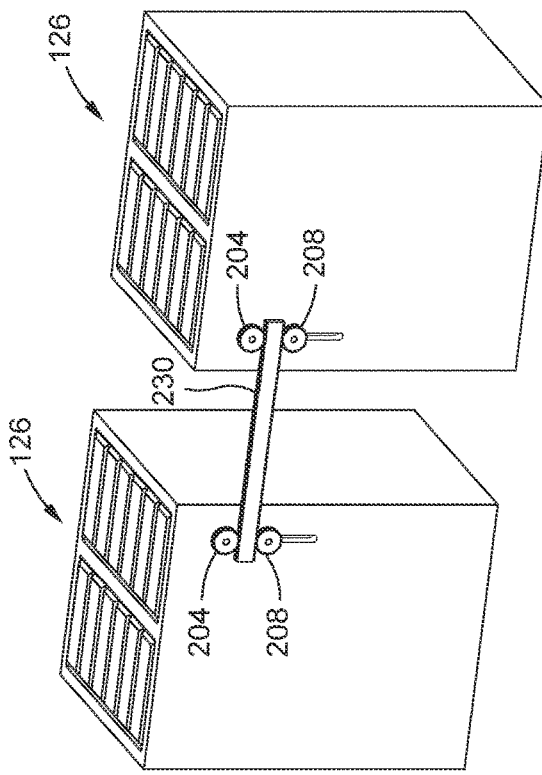
FIG. 17 is a perspective view of a pair of treatment devices interconnected by a device actuation system and illustrating the treatment devices spaced apart from each other in a home position.
Figure 18:
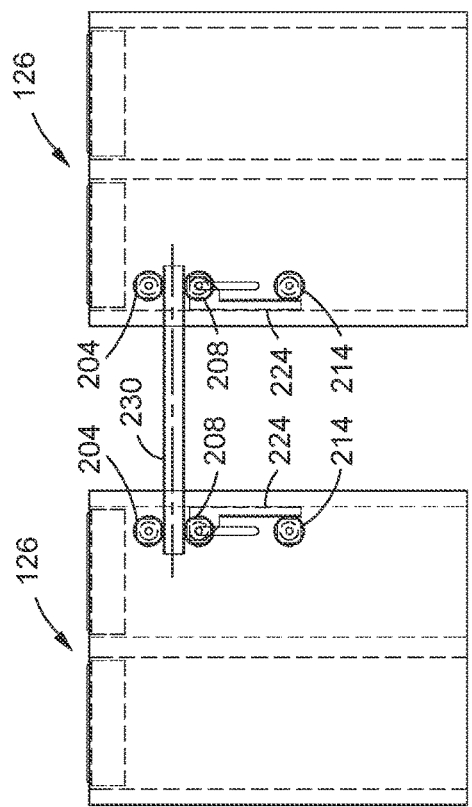
FIG. 18 is a front view of the treatment devices of FIG. 17.

Referring to 17-22, shown are examples of a pair of treatment devices 126 (i.e., a left-hand treatment device and a right-hand treatment device). In any one of the examples disclosed herein, actuation of a treatment device 126 is performed by rotating the first drive gear 204 and the second drive gear 208 of the treatment device 126 according to one of two rotation modes. FIGS. 17-18 illustrate the left-hand treatment device and the right-hand treatment device in a home position prior to translation of the left-hand treatment device (FIGS. 19-20) relative to the right-hand treatment device, and prior to rotation of the left-hand treatment device (FIGS. 21-22) relative to the right-hand treatment device.

FIGS. 19-20 illustrate a mode of operation in which the first drive gear 204 and the second drive gear 208 of the left-hand treatment device are synchronously rotated at the same speed and in opposite directions, to thereby cause translation of the left-hand treatment device relative to the drive rail 230. The synchronous rotation of the first drive gear 204 and the second drive gear 208 at the same speed and in opposite directions causes translation of the left-hand treatment device back and forth along the lengthwise direction of the drive rail 230. For pure translation, with no rotation, of the left-hand treatment device, the first drive gear 204 and the second drive gear 208 are counter-rotated at the same speed.

FIGS. 21-22 illustrate a mode of operation in which the first drive gear 204 and the second drive gear 208 of the left-hand treatment device are differentially rotated at different speeds and in the same or opposite directions, to at least cause rotation of the left-hand treatment device relative to the drive rail 230. The first drive gear 204 and the second drive gear 208 are differentially rotatable at different speeds in a manner causing a combination of rotation and translation of the treatment device 126 relative to the drive rail 230. In another example, rotation of the left-hand treatment device may be achieved by rotating either the first drive gear 204 or the second drive gear 208, while a remaining one of the first drive gear 204 and the second drive gear 208 is non-rotated or is static.

Figure 24:
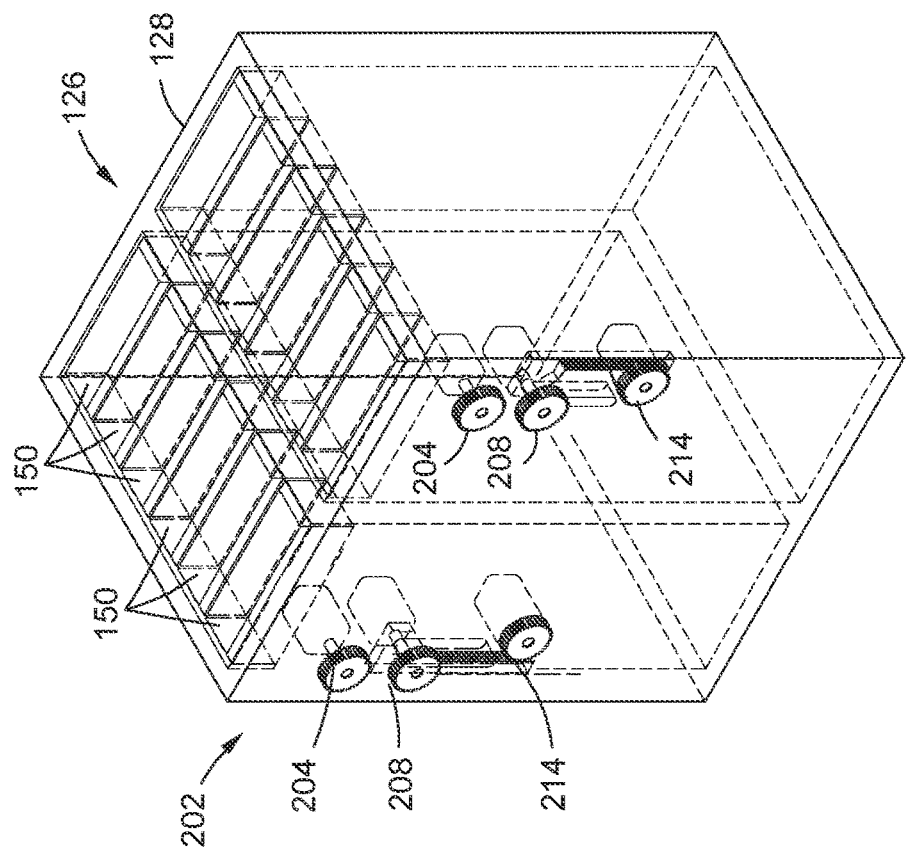
FIG. 24 is a perspective view of treatment device of FIG. 23 showing in hidden lines the first drive gear motor, the second drive motor, the coupler rail, the coupler gear motor, and the coupler gear of each gear system.
Figure 23:
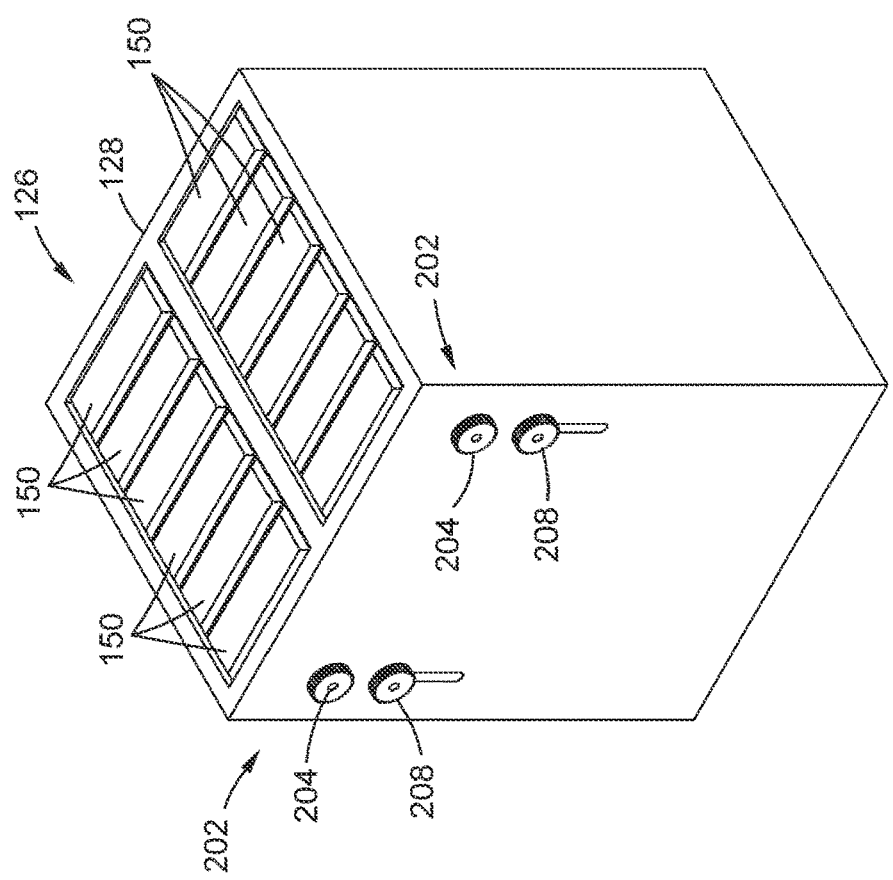
FIG. 23 is a perspective view of an example of a treatment device having a pair of gear systems respectively incorporated into opposite lateral sides of the treatment device.

Referring to FIGS. 23-24, shown is an example of a treatment device 126 having two gear systems 202 mounted on a common lateral side 154 of the device frame 128. The device frame 128 in FIGS. 23-24 is the apex device frame 130 in the array 120 shown in FIG. 7. In FIGS. 23-24, the first drive gear 204 and the second drive gear 208 of each gear system 202 is configured to receive a drive rail 230 that is independent of the drive rail 230 received within the first drive gear 204 and the second drive gear 208 of the other gear system 202. As shown in FIG. 7, the drive rail 230 of each gear system 202 is configured to interconnect with the gear system 202 of an adjacent treatment device 126.

Figure 26:
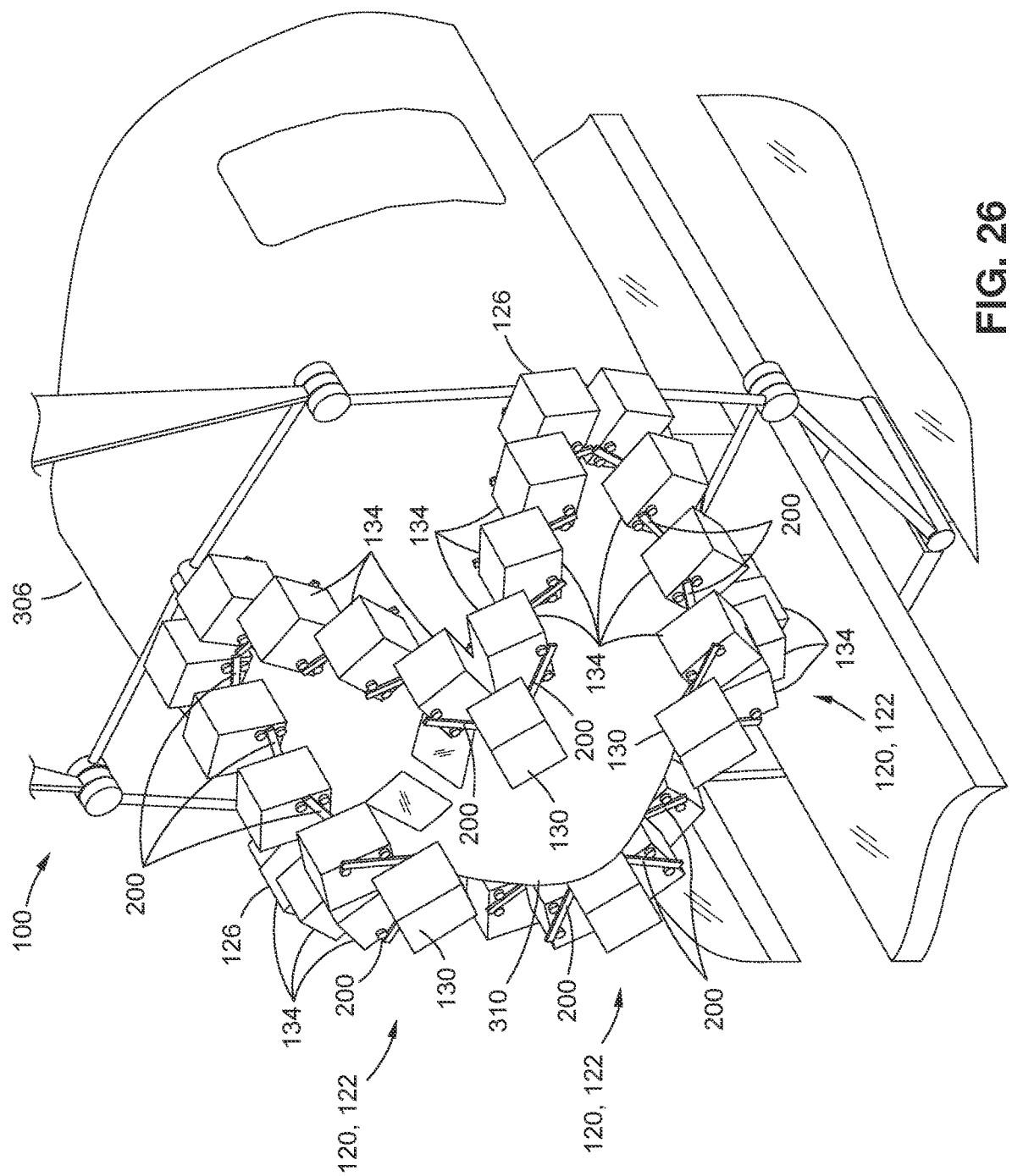
FIG. 26 is a magnified view of the encircled region identified by reference numeral 26 of FIG. 25, and illustrating the treatment devices positioned complementary to the curvature of the nose section.

Referring to FIGS. 25-26, shown is an example of the treatment device system 100 of FIG. 1 positioned over the nose section 310 of the fuselage 306 and illustrating the treatment devices 126 located and oriented complementary to the compound curvature of the nose section 310. In the example shown, the treatment devices 126 form an array 120 in the above-mentioned expanded configuration 122 (e.g., a V-shaped configuration). The device actuation systems 200 interconnecting the treatment devices 126 have moved the apex device frame 130 and the intermediate device frames 134 along the dispensing direction 160 of the respective treatment devices 126, such that the dispensing face of each treatment device 126 is in close proximity to the surface of the nose section 310. In addition, the device actuation systems 200 have oriented the treatment devices 126 such that the dispensing direction 160 (FIG. 8) of each treatment device 126 is locally perpendicular or normal to the surface of the nose section 310, to facilitate livery printing onto the nose section 310 of the fuselage 306.

Figure 27:
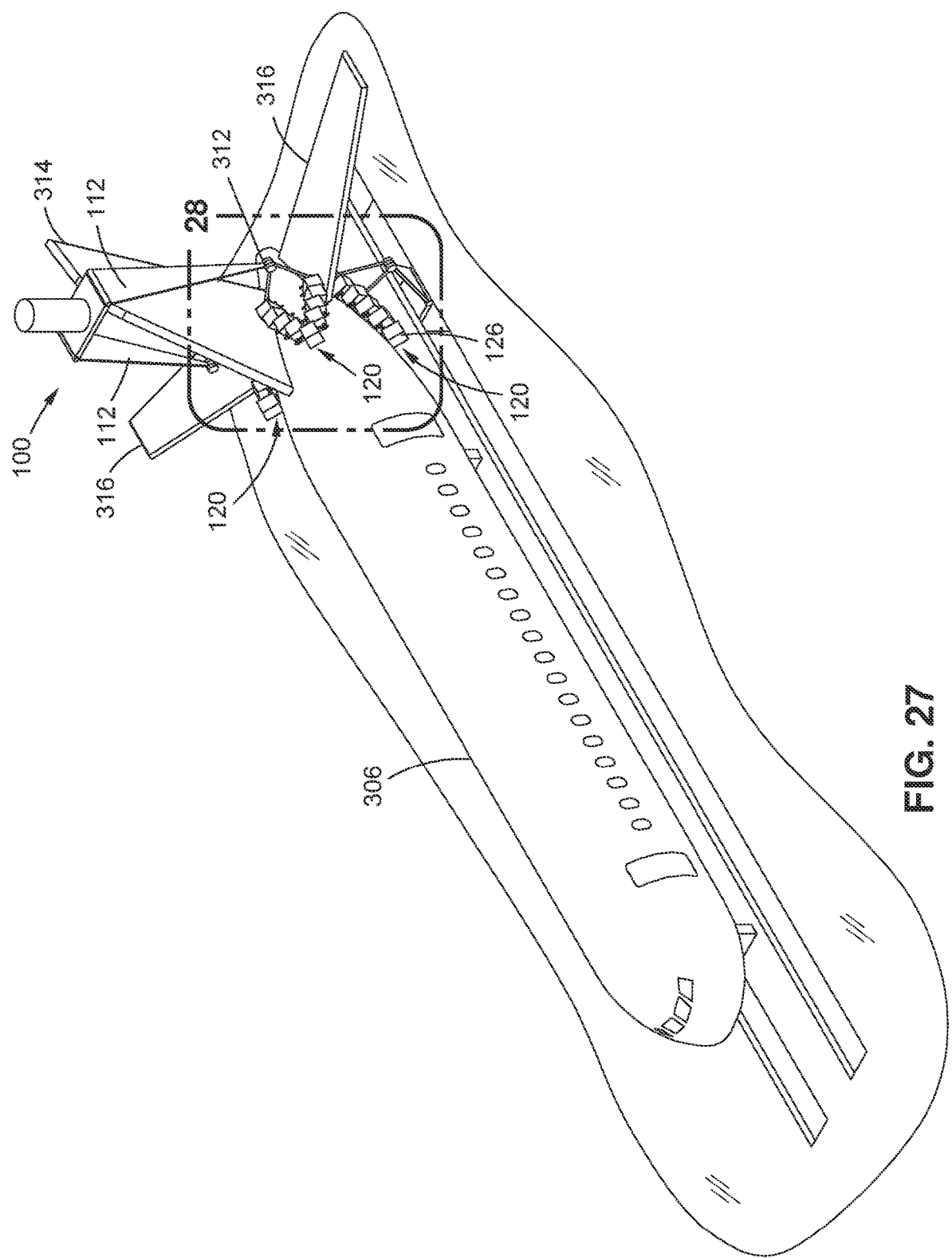
FIG. 27 is a perspective view of an example of the treatment device system positioned at the tail section of the fuselage.
Figure 28:
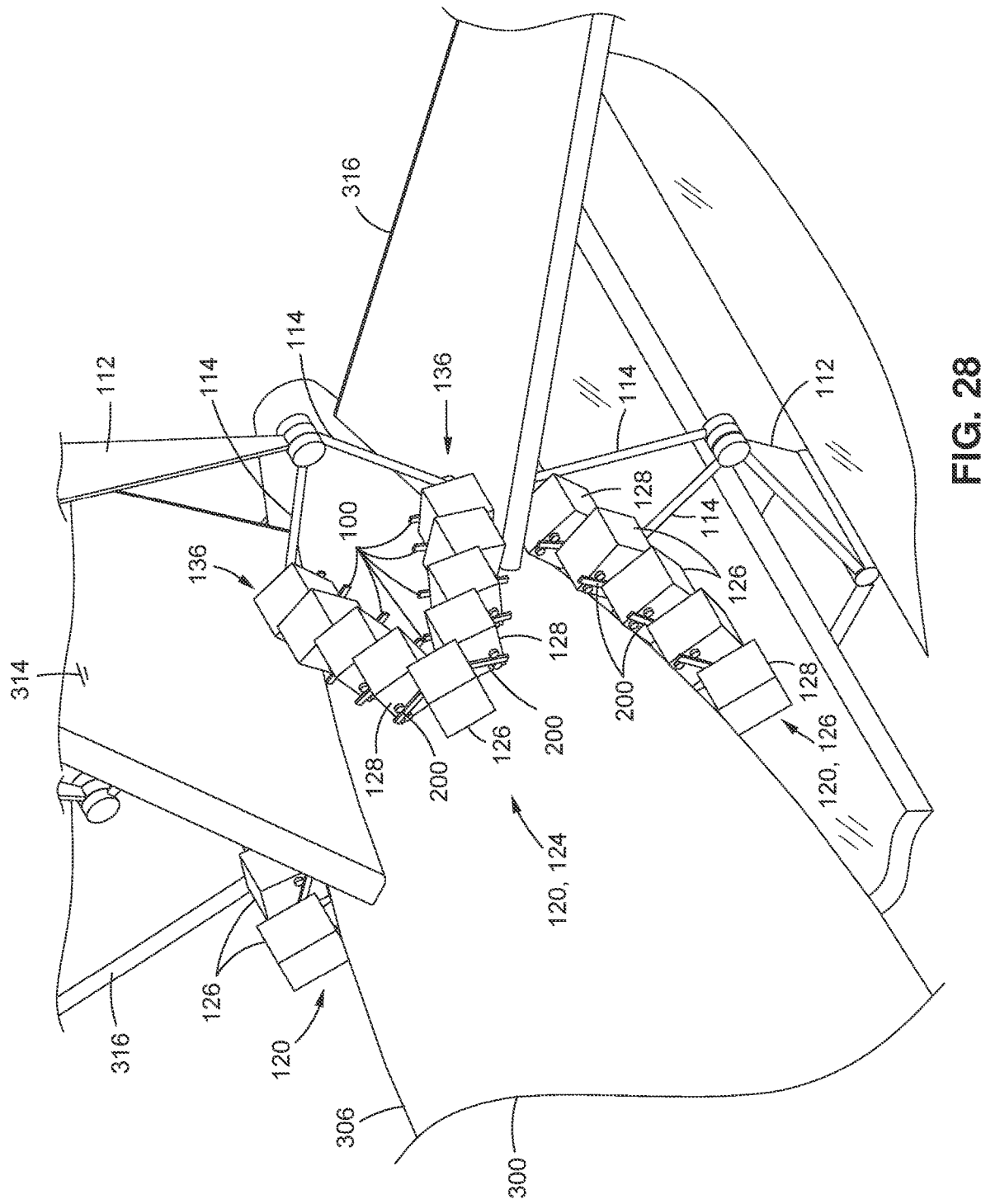
FIG. 28 is a magnified view of the encircled region identified by reference numeral 28 of FIG. 27, and illustrating the treatment devices positioned complementary to the contour of the tail section in the area between the vertical tail and horizontal tail.

Referring to FIGS. 27-28, shown is an example of the treatment device system 100 of FIG. 1 positioned at the tail section 312 of the fuselage 306. On the underside of the fuselage 306, each of the two arrays 120 of treatment devices 126 have been relocated and reoriented into an arrangement similar to the arrangement shown in FIGS. 25-26. On the upper side of the fuselage 306 at the tail section 312, each of the two arrays 120 of treatment devices 126 respectively on opposite sides of the vertical tail 314 are in a semi-contracted configuration to allow each array 120 of treatment devices 126 to fit between the vertical tail 314 and one of the horizontal tails 316, thereby facilitating livery printing on the tail section 312 of the fuselage 306.

As may be appreciated, the components of the treatment device system 100, including the attachment pillars 112, the attachment arms 114, and the device actuation systems 200, may be operated in a manner to position one or more arrays 120 of treatment devices 126 against other areas of the aircraft 304, in addition to the fuselage 306. For example, the treatment device system 100 may be operated in a manner to position an array 120 of treatment devices 126 on each of opposing sides of the vertical tail 314 for livery printing, and/or on other areas of the aircraft 304.

Advantageously, the device actuation systems 200 facilitate compound movements of translation and rotation of treatment devices 126 while occupying a relatively small amount of space. The relatively small amount of space occupied by the device actuation systems 200 allows for the integration of multiple treatment devices 126 within an array 120, enabling automated processing (e.g., livery printing) of large articles 300 (e.g., commercial aircraft 304) in a precise manner and in a significantly reduced amount of time relative to conventional methods.

Figure 29:
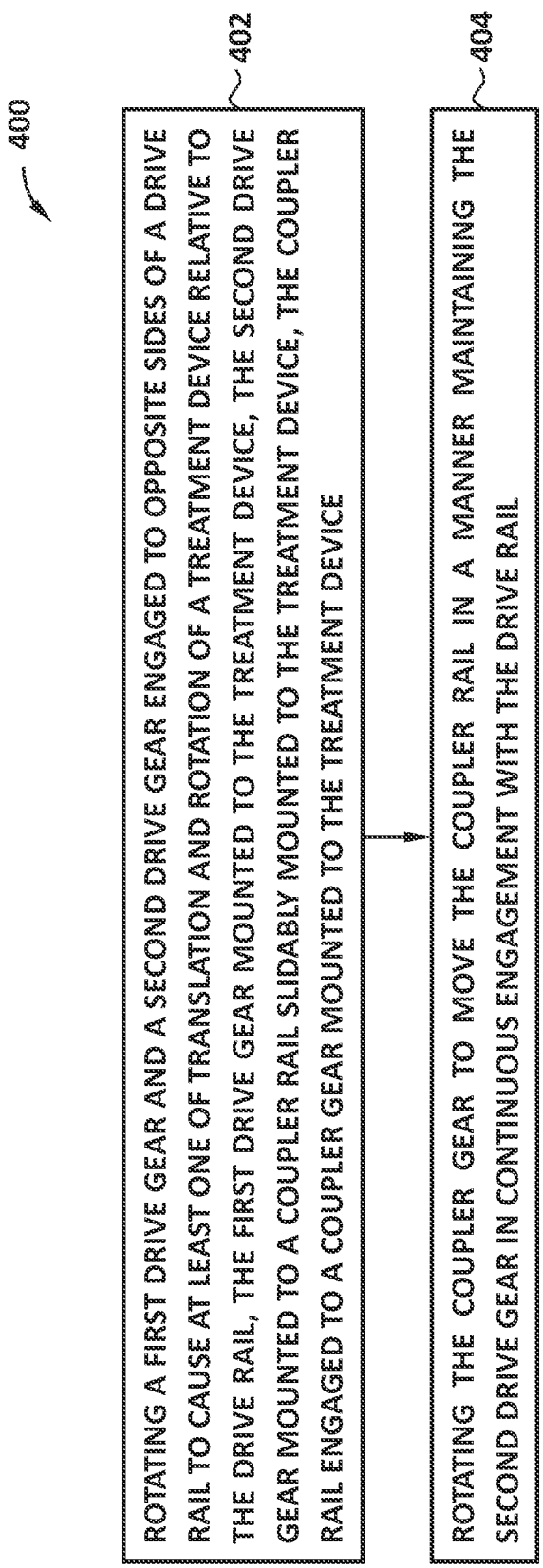
FIG. 29 is a flowchart of a method of actuating a treatment device.

Referring to FIG. 29, shown is a method 500 of actuating one or more treatment devices 126. As indicated above, each treatment device 126 is configured to dispense a treatment toward an article surface 302. The method 500 includes supporting one or more device heads 150 from at least one of a plurality of device frames 128 respectively associated with a plurality of the treatment devices 126, as shown in FIGS. 7-8. As described above, each device frame 128 has at least one gear system 202 coupled to the device frame 128, and each gear system 202 has a first drive gear 204, a second drive gear 208, a coupler gear 214, and a coupler rail 224. In the example of FIG. 7, the end device frames 132 and the intermediate device frame 134 each have a gear system 202 mounted to each of opposing lateral sides 154 of the device frame 128.

Step 502 of the method 500 comprises rotating the first drive gear 204 and the second drive gear 208, which are engaged to opposite sides of a drive rail 230, to thereby cause translation and/or rotation of a treatment device 126 relative to the drive rail 230. As shown in FIGS. 8-15 and described above, the first drive gear 204 is mounted to the treatment device 126, and the second drive gear 208 is mounted to the coupler rail 224. The coupler rail 224 is slidably mounted to the treatment device 126. The coupler rail 224 is engaged to the coupler gear 214, which is mounted to the treatment device 126, as described above.

Step 502 of rotating the first drive gear 204 and the second drive gear 208 includes independently rotating, under control of the controller 182, the first drive gear 204 and the second drive gear 208 respectively via the first drive gear motor 206 and the second drive gear motor 210. In addition, the method includes independently rotating the coupler gear 214 via the coupler gear motor 216, which is also controlled by the controller 182. As mentioned above and shown in FIGS. 8-15, the first drive gear motor 206 and the coupler gear motor 216 are mounted to the device frame 128, and the second drive gear motor 210 is mounted to the coupler rail 224.

Step 502 of rotating the first drive gear 204 and the second drive gear 208 of a treatment device 126 additionally comprises rotating the first drive gear 204 and the second drive gear 208 according to one of two rotation modes. One rotation mode includes synchronously rotating the first drive gear 204 and the second drive gear 208 at the same speed and in opposite directions to cause translation of the treatment device 126 relative to the drive rail 230. In this regard, the treatment device 126 is translated back and forth along the lengthwise direction of the drive rail 230 during synchronized rotation of the first drive gear 204 and the second drive gear 208. Another rotation mode includes differentially rotating the first drive gear 204 and the second drive gear 208 at different speeds and in the same or opposite directions to at least cause rotation of the treatment device 126 relative to the drive rail 230. As mentioned above, in some examples, the process of differentially rotating the first drive gear 204 and the second drive gear 208 of a treatment device 126 comprises differentially rotating the first drive gear 204 and the second drive gear 208 at different speeds in a manner causing a combination of rotation and translation of the treatment device 126 relative to the drive rail 230. In a still further example, differentially rotating the first drive gear 204 and the second drive gear 208 comprises rotating either the first drive gear 204 or the second drive gear 208, while the remaining first drive gear 204 or the second drive gear 208 is static.

Step 504 of the method 500 comprises rotating the coupler gear 214 to move the coupler rail 224 in a manner to maintain the second drive gear 208 in continuous engagement with the drive rail 230. As mentioned above, the drive rail 230 is captured between the first drive gear 204 and the second drive gear 208. Differential rotation of the first drive gear 204 and the second drive gear 208 causes rotation of the treatment device 126 relative to the drive rail 230. As shown in FIGS. 12-15 and described above, rotation of the treatment device 126 relative to the drive rail 230 requires continuous adjustment of the distance of the second drive gear 208 from the first drive gear 204 in order to maintain the second drive gear 208 (and first drive gear 204) in continuous engagement with the drive rail 230. The force applied by the second drive gear 208 against the drive rail 230 maintains the rail teeth 226 on the opposite side of the drive rail 230 in continuous engagement with the gear teeth 228 of the first drive gear 204.

Referring briefly to the example of the gear system 202 of FIG. 16, the method 500 includes maintaining the drive rail 230 in alignment with the first drive gear 204 and second drive gear 208 via a pair of circumferential ridges 220 respectively on a pair of gear sides 218 of the first drive gear 204 and the second drive gear 208. As mentioned above, the circumferential ridges 220 on each gear side 218 of the first drive gear 204 and the second drive gear 208 extend over the rail sides 232, which prevents the drive rail 230 for moving out of alignment with the first drive gear 204 and the second drive gear 208.

Referring briefly to FIG. 7, the operation of the treatment device system 100 comprises operating a plurality of device actuation systems 200 as a means to locate and orient a plurality of treatment devices 126. In this regard, step 502 of rotating the first drive gear 204 and the second drive gear 208 comprises rotating the first drive gear 204 and the second drive gear 208 of at least one treatment device 126 of at least one adjacent pair of treatment devices 126 interconnected by a drive rail 230, thereby causing translation and/or rotation of the pair of treatment devices 126 relative to each other. The treatment devices 126 are actuated relative to each other in a manner to maintain each treatment device 126 at a predetermined spacing and orientation relative to an article surface 302, while the treatment devices 126 are moved over the article 300.

With continued reference to the example of FIG. 7, the method 500 comprises supporting the plurality of device frames 128 as an array 120, wherein each adjacent pair of device frames 128 is interconnected by a drive rail 230 located between the first drive gear 204 and the second drive gear 208 of the device frames 128. For such an arrangement, the method includes rotating the first drive gear 204, the second drive gear 208, and the coupler gear 214 respectively of the plurality of devices frame in a manner to move the array 120 between an expanded configuration 122 and a contracted configuration 124, and any configuration therebetween, to facilitate conforming the treatment devices 126 to the local geometry of an article surface 302.

In the example of FIGS. 1-5, the method 500 comprises supporting at least one array 120 of treatment devices 126 from a treatment device support assembly 102, 104 having a pair of attachment pillars 112, each pivotably coupled to a pair of attachment arms 114. The opposite ends of each attachment arm 114 are coupled respectively to opposite ends of an array 120 of treatment devices 126. In the example shown, the treatment device system 100 includes an upper treatment device support assembly 102 and a lower treatment device support assembly 104 each having arrays 120 of treatment devices 126 in side-by-side arrangement, as described above. For such an arrangement, the method includes pivoting the attachment arms 114 relative to each other, and in coordination with the operation of the device actuation systems 200 in a manner to move each array 120 of treatment devices 126 between an expanded configuration 122 and a contracted configuration 124, to thereby position and orient each treatment device 126 complementary to the local contour of an article surface 302, as the overhead gantry 172 and the pit gantry 178 respectively move the upper treatment device support assembly 102 and the lower treatment device support assembly 104 along the lengthwise direction of the article 300 (e.g., fuselage 306) being processed.

The method 500 additionally includes dispensing a treatment from one or more device heads 150 of the treatment devices 126. A treatment may be dispensed from the device heads 150 while the treatment devices 126 are moved over the article 300. In addition, a treatment may be dispensed from the device heads 150 while the device actuation systems 200 continuously adjust the position and orientation of the treatment devices 126 relative to the article surface 302 as the treatment devices 126 are moved over the article 300. Treatment may also be dispensed from the device heads 150 while the treatment devices 126 are stationary relative to the article surfaces 302.

The dispensing of the treatment from the device heads 150 may include dispensing a treatment from device heads 150 configured as inkjet printheads 152. For example, the dispensing of the treatment may include dispensing ink from the inkjet printheads 152. The ink may be provided in a variety of compositions including, but not limited to, a primer, a paint, a clear coat, a sealant, or any one of a variety of other substances capable of being dispensed from an inkjet printhead 152. In one example, the inkjet printheads 152 may dispense ink for printing an aircraft livery on a fuselage 306, as shown in the example of FIGS. 1-5 and 25-28. However, as indicated above, the dispensing of treatment from the treatment devices 126 may include dispensing substances such solvents, adhesives, lubricants, abrasive particles, or any one a variety of other types of gas, liquid, semi-solid, or solid substances. Even further, the dispensing of treatment from the treatment devices 126 may include emitting radiation from the treatment devices 126 for performing any one of a variety of functions, such as curing an article 300 formed of composite (e.g., graphite-epoxy) material.

Additional modifications and improvements of the present disclosure may be apparent to those of ordinary skill in the art. Thus, the particular combination of parts described and illustrated herein is intended to represent only certain examples of the present disclosure and is not intended to serve as limitations of alternative examples or devices within the spirit and scope of the disclosure.

What is claimed is:

1. A device actuation system for actuating a treatment device, comprising:
   a gear system couplable to a treatment device, including:
   a first drive gear rotatably mountable to the treatment device;
   a coupler rail slidably mountable to the treatment device;
   a second drive gear rotatably mountable to the coupler rail;
   a coupler gear rotatably mountable to the treatment device and engageable with the coupler rail;
   a drive rail locatable between the first drive gear and the second drive gear of the gear system;
   the coupler gear is rotatable to move the coupler rail in a manner maintaining the second drive gear in continuous engagement with the drive rail against the first drive gear; and
   the first drive gear and the second drive gear are rotatable in a manner causing at least one of translation and rotation of the treatment device relative to the drive rail.

2. The device actuation system of claim 1, wherein the first drive gear and the second drive gear are rotatable according to one of two rotation modes, comprising:
   the first drive gear and the second drive gear are synchronously rotatable at the same speed and in opposite directions to cause translation of the treatment device relative to the drive rail;
   the first drive gear and the second drive gear are differentially rotatable at different speeds and in the same or opposite directions to at least cause rotation of the treatment device relative to the drive rail.

3. The device actuation system of claim 2, wherein:
   the first drive gear and the second drive gear are differentially rotatable at different speeds in a manner causing a combination of rotation and translation of the treatment device relative to the drive rail.

4. The device actuation system of claim 2, wherein during differential rotation of the first drive gear and the second drive gear:
   one of the first drive gear and the second drive gear is rotated; and
   a remaining one of the first drive gear and the second drive gear is non-rotated.

5. The device actuation system of claim 1, wherein:
   the first drive gear, the second drive gear, and the coupler gear are independently rotatably driven respectively by a first drive gear motor, a second drive gear motor, and a coupler gear motor, under the control of a controller.

6. The device actuation system of claim 1, wherein:
   the drive rail defines a plane of rotation during actuation of the treatment device; and
   the coupler gear and the coupler rail are mountable to the treatment device outside of the plane of rotation, to thereby increase an angular range of rotation of the treatment device.

7. The device actuation system of claim 1, wherein:
   the treatment device has a dispensing direction from which the treatment device dispenses a treatment, and a lateral side that is non-parallel to the dispensing direction; and
   the gear system is couplable to the lateral side.

8. A treatment device support assembly for actuating a plurality of treatment devices relative to each other for treating an article surface of an article, comprising:
   a plurality of device actuation systems, each configured to interconnect an adjacent pair of treatment devices, each device actuation system including:
   a gear system couplable to each treatment device of the adjacent pair of treatment devices, the gear system of each treatment device including:
   a first drive gear rotatably mountable to the treatment device;
   a coupler rail slidably mountable to the treatment device;
   a second drive gear rotatably mountable to the coupler rail;
   a coupler gear rotatably mountable to the treatment device and engageable with the coupler rail;
   a drive rail configured to interconnect the adjacent pair of treatment devices, and locatable between the first drive gear and the second drive gear of each treatment device of the adjacent pair of treatment devices;
   wherein, for each treatment device of the adjacent pair of treatment devices:
   the coupler gear is rotatable to move the coupler rail in a manner maintaining the second drive gear in continuous engagement with the drive rail against the first drive gear; and
   the first drive gear and the second drive gear are rotatable in a manner causing at least one of translation and rotation of the treatment device relative to the drive rail.

9. The treatment device support assembly of claim 8, wherein the first drive gear and the second drive gear are rotatable according to one of two rotation modes, including:
   the first drive gear and the second drive gear are synchronously rotatable at the same speed and in opposite directions to cause translation of the treatment device relative to the drive rail; and
   the first drive gear and the second drive gear are differentially rotatable at different speeds and in the same or opposite directions to at least cause rotation of the treatment device relative to the drive rail.

10. The treatment device support assembly of claim 9, wherein:
    the first drive gear and the second drive gear are differentially rotatable at different speeds in a manner causing a combination of rotation and translation of the treatment device relative to the drive rail.

11. The treatment device support assembly of claim 9, wherein during differential rotation of the first drive gear and the second drive gear:
    one of the first drive gear and the second drive gear is rotated; and
    a remaining one of the first drive gear and the second drive gear is non-rotated.

12. The treatment device support assembly of claim 8, further comprising:
    a plurality of device frames respectively associated with the plurality of treatment devices, each device frame configured to support one or more device heads, and each device frame having at least one gear system coupled to the device frame.

13. The treatment device support assembly of claim 12, wherein:
    the device frame of each treatment device has a dispensing direction from which the treatment device dispenses a treatment, and a lateral side that is non-parallel to the dispensing direction; and the gear systems respectively of the adjacent pair of treatment devices are respectively coupled to the lateral sides that generally face each other.

14. A method of actuating at least one treatment device, comprising:

rotating a first drive gear and a second drive gear engaged to opposite sides of a drive rail to cause at least one of translation and rotation of a treatment device relative to the drive rail, the first drive gear mounted to the treatment device, the second drive gear mounted to a coupler rail slidably mounted to the treatment device, the coupler rail engaged to a coupler gear mounted to the treatment device; and rotating the coupler gear to move the coupler rail in a manner maintaining the second drive gear in continuous engagement with the drive rail.

15. The method of claim 14, wherein rotating the first drive gear and the second drive gear comprises rotating the first drive gear and the second drive gear according to one of two rotation modes, including:

synchronously rotating the first drive gear and the second drive gear at the same speed and in opposite directions to cause translation of the treatment device relative to the drive rail;

differentially rotating the first drive gear and the second drive gear at different speeds and in the same or opposite directions to at least cause rotation of the treatment device relative to the drive rail.

16. The method of claim 15, wherein differentially rotating the first drive gear and the second drive gear comprises:

differentially rotating the first drive gear and the second drive gear at different speeds in a manner causing a combination of rotation and translation of the treatment device relative to the drive rail.

17. The method of claim 15, wherein differentially rotating the first drive gear and the second drive gear comprises:

rotating one of the first drive gear and the second drive gear while a remaining one of the first drive gear and the second drive gear is static.

18. The method of claim 15, wherein rotating the first drive gear and the second drive gear comprises:

independently rotating the first drive gear, the second drive gear, and the coupler gear respectively via a first drive gear motor, a second drive gear motor, and a coupler gear motor.

19. The method of claim 14, wherein rotating the first drive gear and the second drive gear comprises:

rotating the drive rail along a plane of rotation located outboard of the coupler gear and the coupler rail.

20. The method of claim 14, further comprising:

supporting the plurality of device frames as an array, each adjacent pair of the device frames interconnected by a drive rail located between the first drive gear and the second drive gear of each of the adjacent pair of the device frames; and rotating the first drive gear, the second drive gear, and the coupler gear respectively of the plurality of devices frame in a manner to move the array to match the treatment devices to a contour of an article surface.

* * * * *